US011868730B2

United States Patent
Hou et al.

(10) Patent No.: US 11,868,730 B2
(45) Date of Patent: Jan. 9, 2024

(54) METHOD AND SYSTEM FOR ASPECT-LEVEL SENTIMENT CLASSIFICATION BY GRAPH DIFFUSION TRANSFORMER

(71) Applicants: JINGDONG DIGITS TECHNOLOGY HOLDING CO., LTD., Beijing (CN); JD FINANCE AMERICA CORPORATION, Wilmington, DE (US)

(72) Inventors: Xiaochen Hou, Mountain View, CA (US); Jing Huang, Mountain View, WA (US); Guangtao Wang, Cupertino, CA (US); Xiaodong He, Beijing (CN); Bowen Zhou, Beijing (CN)

(73) Assignees: JINGDONG DIGITS TECHNOLOGY HOLDING CO., LTD., Beijing (CN); JD FINANCE AMERICA CORPORATION, Wilmington, DE (US)

( * ) Notice: Subject to any disclaimer, the term of this patent is extended or adjusted under 35 U.S.C. 154(b) by 323 days.

(21) Appl. No.: 17/327,830

(22) Filed: May 24, 2021

(65) Prior Publication Data

US 2022/0092267 A1 Mar. 24, 2022

Related U.S. Application Data

(60) Provisional application No. 63/082,105, filed on Sep. 23, 2020.

(51) Int. Cl.
*G06F 40/30* (2020.01)
*G06F 40/279* (2020.01)
*G06F 40/205* (2020.01)

(52) U.S. Cl.
CPC ............ *G06F 40/30* (2020.01); *G06F 40/205* (2020.01); *G06F 40/279* (2020.01)

(58) Field of Classification Search
CPC ...... G06F 40/30; G06F 40/205; G06F 40/279; G06F 16/353
See application file for complete search history.

(56) References Cited

U.S. PATENT DOCUMENTS

| | | | |
|---|---|---|---|
| 2019/0122145 A1* | 4/2019 | Sun | .......................... G06N 20/00 |
| 2021/0034988 A1 | 2/2021 | Adel-Vu et al. | |
| 2021/0050033 A1* | 2/2021 | Bui | .......................... G06F 17/16 |

FOREIGN PATENT DOCUMENTS

| | | |
|---|---|---|
| CN | 107180247 A | 9/2017 |
| CN | 111985245 A | 11/2020 |

(Continued)

OTHER PUBLICATIONS

Orr, J. Walker, et al. "Event detection with neural networks: A rigorous empirical evaluation." arXiv preprint arXiv:1808.08504 (2018), pp. 1-6 (Year: 2018).*

(Continued)

*Primary Examiner* — Jesse S Pullias
*Assistant Examiner* — Michael C. Lee
(74) *Attorney, Agent, or Firm* — Scully, Scott, Murphy & Presser, P.C.

(57) ABSTRACT

System and method for aspect-level sentiment classification. The system includes a computing device, the computing device has a processer and a storage device storing computer executable code. The computer executable code is configured to: receive a sentence having a labeled aspect term and context; convert the sentence into a dependency tree graph; calculate an attention matrix of the dependency tree graph based on one-hop attention between any two nodes of the graph; calculate multi-head attention diffusion for any two nodes from the attention matrix; obtain updated embedding (Continued)

of the graph using the multi-head diffusion attention; classify the aspect term based on the updated embedding of the graph to obtain predicted classification of the aspect term; calculate loss function based on the predicted classification and the ground truth label of the aspect term; and adjust parameters of models in the computer executable code based on the loss function.

19 Claims, 11 Drawing Sheets

(56) References Cited

FOREIGN PATENT DOCUMENTS

| CN | 112183102 A | 1/2021 |
|---|---|---|
| CN | 112347248 A | 2/2021 |

OTHER PUBLICATIONS

Chen, Junjie, et al. "GCNDA: Graph Convolutional Networks with Dual Attention Mechanisms for Aspect Based Sentiment Analysis." Neural Information Processing: 26th International Conference, ICONIP 2019, Sydney, NSW, Australia, Dec. 12-15, 2019, pp. 189-197. (Year: 2019).*
Davis, Timothy A. "Algorithm 1000: SuiteSparse: GraphBLAS: Graph algorithms in the language of sparse linear algebra." ACM Transactions on Mathematical Software (TOMS) 45.4 (2019), pp. 1-25 (Year: 2019).*
Talman, Aarne, et al. "Sentence Embeddings in NLI with Iterative Refinement Encoders." arXiv preprint arXiv: 1808.08762 (Jun. 3, 2019), pp. 1-18 (Year: 2019).*
Huang, Binxuan, et al. "Syntax-aware aspect level sentiment classification with graph attention networks." arXiv preprint arXiv: 1909.02606 (2019), pp. 1-9 (Year: 2019).*
Yin, Chang, et al. "Multi-hop Syntactic Graph Convolutional Networks for Aspect-Based Sentiment Classification." Knowledge Science, Engineering and Management: 13th International Conference, KSEM 2020, Hangzhou, China, Aug. 28-30, 2020, pp. 213-224 (Year: 2020).*
Zhang, Bowen, et al. "Knowledge guided capsule attention network for aspect-based sentiment analysis." IEEE/ACM Transactions on Audio, Speech, and Language Processing 28 (Aug. 17, 2020), pp. 2538-2551. (Year: 2020).*
Hou, Xiaochen, et al. "Selective attention based graph convolutional networks for aspect-level sentiment classification." arXiv preprint arXiv: 1910.10857 (Apr. 7, 2020), pp. 1-10 (Year: 2020).*
International Search Report and Written Opinion dated Dec. 15, 2021 issued in PCT/CN2021/119059, 8 pages.
Peng Chen, Zhongqian Sun, Lidong Bing, Wei Yang, Recurrent Attention Network on Memory for Aspect Sentiment Analysis, Proceedings of the 2017 Conference on Empirical Methods in Natural Language Processing, 2017, 452-461.
Jacob Devlin, Ming-Wei Chang, Kenton Lee, Kristina Toutanova, BERT: Pre-training of Deep Bidirectional Transformers for Language Understanding, Proceedings of NAACL-HLT 2019, 2019, 4171-4186.
Li Dong, Furu Wei, Chuanqi Tan, Duyu Tang, Ming Zhou, Ke Xu, Adaptive Recursive Neural Network for Target-dependent Twitter Sentiment Classification, Proceedings of the 52nd Annual Meeting of the Association for Computational Linguistics, 2014, v2:49-54.
Feifan Fan, Yansong Feng, Dongyan Zhao, Multi-grained Attention Network for Aspect-Level Sentiment Classification, Proceedings of the 2018 Conference on Empirical Methods in Natural Language Processing, 2018, 3433-3442.
Ruidan He, Wee Sun Lee, Hwee Tou Ng, Daniel Dahlmeier, Effective Attention Modeling for Aspect-Level Sentiment Classification, Proceedings of the 27th International Conference on Computational Linguistics, 2018, 1121-1131.
Binxuan Huang, Kathleen M. Carley, Syntax-Aware Aspect Level Sentiment Classification with Graph Attention Networks, Proceedings of the 2019 Conference on Empirical Methods in Natural Language Processing and the 9th International Joint Conference on Natural Language Processing, 2019, 5469-5477.
Thomas N. Kipf, Max Welling, Semi-Supervised Classification with Graph Convolutional Networks, 2017, arXiv:1609.02907.
Johannes Klicpera, Aleksandar Bojchevski, Stephan Gunnemann, Predict then Propagate: Graph Neural Networks meet Personalized PageRank, ICLR, 2019.
Lishuang Li, Yang Liu, AnQiao Zhou, Hierarchical Attention Based Position-Aware Network for Aspect-Level Sentiment Analysis, Proceedings of the 22nd Conference on Computational Natural Language Learning, 2018, 181-189.
Qimai Li, Zhichao Han, Xiao-Ming Wu, Deeper Insights Into Graph Convolutional Networks for Semi-Supervised Learning, AAAI, 2018, 3538-3545.
Xin Li, Lidong Bing, Wai Lam, Bei Shi, Transformation Networks for Target-Oriented Sentiment Classification, Proceedings of the 56th Annual Meeting of the Association for Computational Linguistics, 2018, 946-956.
Jiangming Liu, Yue Zhang, Attention Modeling for Targeted Sentiment, Proceedings of the 15th Conference of the European Chapter of the Association for Computational Linguistics, 2017, 2:572-577.
Christopher Manning, Mihai Surdeanu, John Bauer, Jenny Finkel, Steven Bethard, David McClosky, The Stanford CoreNLP Natural Language Processing Toolkit, Proceedings of 52nd Annual Meeting of the Association for Computational Linguistics: System Demonstrations, 2014, 55-60.
Thien Hai Nguyen, Kiyoaki Shirai, PhraseRNN: Phrase Recursive Neural Network for Aspect-based Sentiment Analysis, Proceedings of the 2015 Conference on Empirical Methods in Natural Language Processing, 2015, 2509-2514.
Alexander Rietzler, Sebastian Stabinger, Paul Opitz, Stefan Engl, Adapt or Get Left Behind: Domain Adaptation through BERT Language Model Finetuning for Aspect-Target Sentiment Classification, LREC 2020, 2020, 4933-4941.
Uday Shankar Shanthamallu, Jayaraman J. Thiagarajan, A Regularized Attention Mechanism for Graph Attention Networks, ICASSP 2020, 2020, 3372-3376.
Youwei Song, Jiahai Wang, Tao Jiang, Zhiyue Liu, Yanghui Rao, Attentional Encoder Network for Targeted Sentiment Classification, 2019, arXiv:1902.09314.
Nitish Srivastava, Geoffrey Hinton, Alex Krizhevsky, Ilya Sutskever, Ruslan Salakhutdinov, Dropout: A Simple Way to Prevent Neural Networks from Overfitting, The Journal of Machine Learning Research, 2014, 15(56):1929-1958.
Kai Sun, Richong Zhang, Samuel Mensah, Yongyi Mao, Xudong Liu, Aspect-Level Sentiment Analysis Via Convolution over Dependency Tree, EMNLP-IJCNLP, 2019, 5679-5688.
Duyu Tang, Bing Qin, Xiaocheng Feng, Ting Liu, Effective LSTMs for Target-Dependent Sentiment Classification, Proceedings of COLING 2016, the 26th International Conference on Computational Linguistics, 2016, 3298-3307.
Duyu Tang, Bing Qin, Ting Liu, Aspect Level Sentiment Classification with Deep Memory Network, Proceedings of the 2016 Conference on Empirical Methods in Natural Language Processing, 2016, 214-224.
Petar Veličković, Guillem Cucurull, Arantxa Casanova, Adriana Romero, Pietro Liò, Yoshua Bengio, Graph Attention Networks, 2018, arXiv:1710.10903.
Bailin Wang, Wei Lu, Learning Latent Opinions for Aspect-level Sentiment Classification, AAAI 2018, 2018.
Guangtao Wang, Rex Ying, Jing Huang, Jure Leskovec, Improving Graph Attention Networks with Large Margin-based Constraints,, NeurIPS 2019, 2019.
Kai Wang, Weizhou Shen, Yunyi Yang, Xiaojun Quan, Rui Wang, Relational Graph Attention Network for Aspect-based Sentiment Analysis, Proceedings of the 58th Annual Meeting of the Association for Computational Linguistics, 2020, 3229-3238.
Minjie Wang, Da Zheng, Zihao Ye, Quan Gan, Mufei Li, Xiang Song, Jinjing Zhou, Chao Ma, Lingfan Yu, Yu Gai, Tianjun Xiao, Tong He, George Karypis, Jinyang Li, Zheng Zhang, Deep Graph

(56) References Cited

OTHER PUBLICATIONS

Library: A Graph-Centric, Highly-Performant Package for Graph Neural Networks, 2020, arXiv:1909.01315.

Shuai Wang, Sahisnu Mazumder, Bing Liu, Mianwei Zhou, Yi Chang, Target-Sensitive Memory Networks for Aspect Sentiment Classification, Proceedings of the 56th Annual Meeting of the Association for Computational Linguistics, 2018, 1:957-967.

Hu Xu, Bing Liu, Lei Shu, Philip S. Yu, BERT Post-Training for Review Reading Comprehension and Aspect-based Sentiment Analysis, 2019, arXiv:1904.02232.

Keyulu Xu, Chengtao Li, Yonglong Tian, Tomohiro Sonobe, Kenichi Kawarabayashi, Stefanie Jegelka, Representation Learning on Graphs with Jumping Knowledge Networks, 2018, arXiv:1806.03536.

Chen Zhang, Qiuchi Li, Dawei Song, Aspect-based Sentiment Classification with Aspect-specific Graph Convolutional Networks, Proceedings of the 2019 Conference on Empirical Methods in Natural Language Processing and the 9th International Joint Conference on Natural Language Processing (EMNLP-IJCNLP), 2019, 4568-4578.

Yuhao Zhang, Peng Qi, Christopher D. Manning, Graph Convolution over Pruned Dependency Trees Improves Relation Extraction, Proceedings of the 2018 Conference on Empirical Methods in Natural Language Processing, 2018, 2205-2215.

Shiliang Zheng, Rui Xia, Left-Center-Right Separated Neural Network for Aspect-based Sentiment Analysis with Rotatory Attention, 2018, arXiv:1802.00892.

Victor Zhong, Caiming Xiong, Nitish Shirish Keskar, Richard Socher, Coarse-grain Fine-grain Coattention Network for Multi-evidence Question Answering, 2019, arXiv:1901.00603.

\* cited by examiner

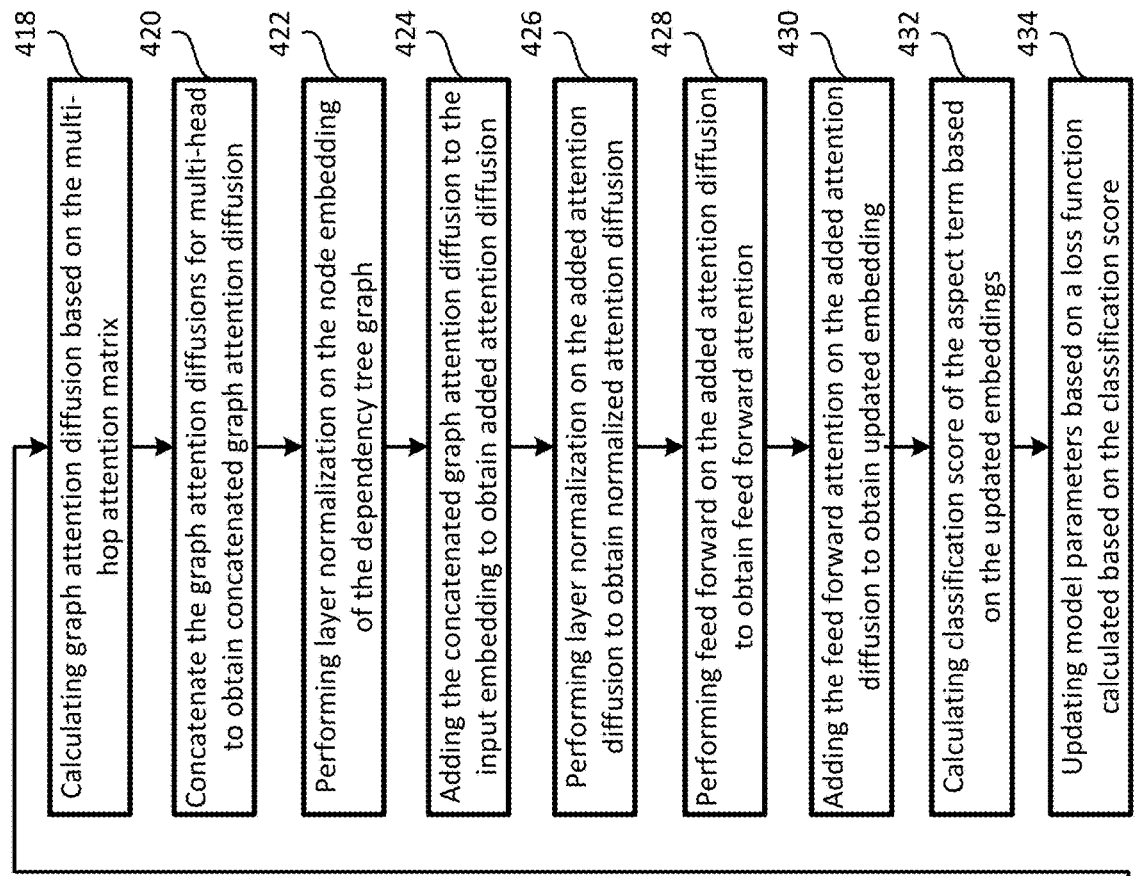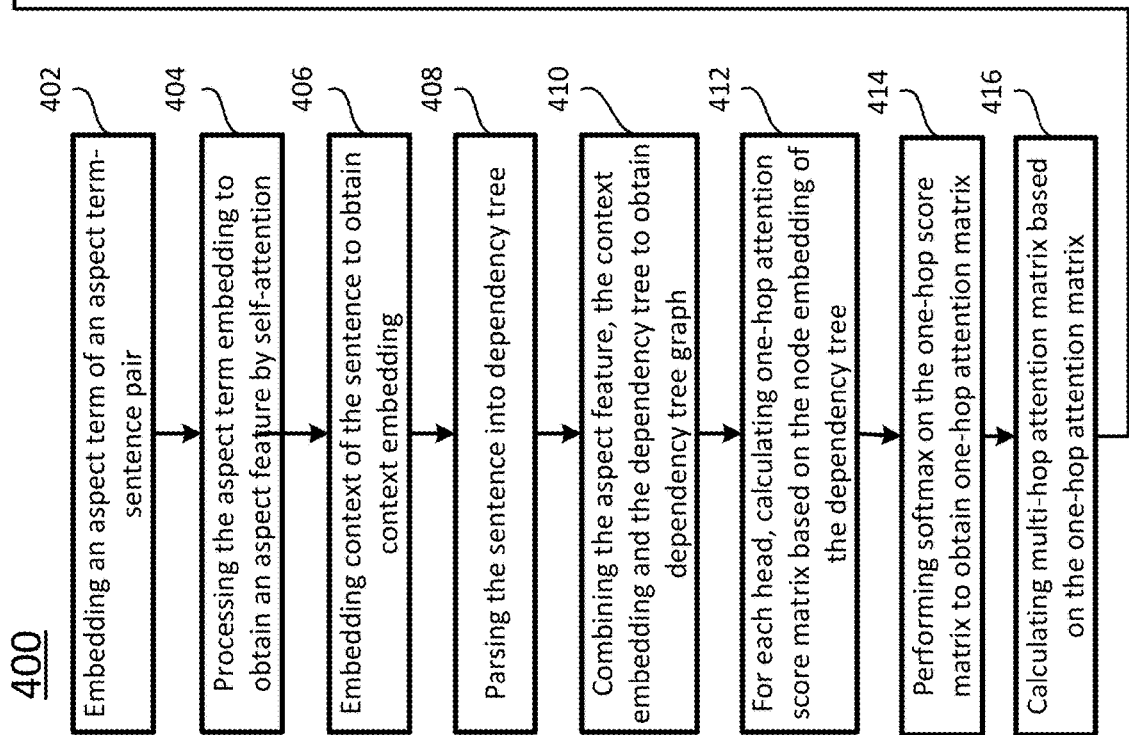
FIG. 4

Table 1

| Dataset | Positive | | Neutral | | Negative | |
|---|---|---|---|---|---|---|
| | Train | Test | Train | Test | Train | Test |
| Laptop | 987 | 341 | 460 | 169 | 866 | 128 |
| Restaurant | 2164 | 728 | 633 | 196 | 805 | 196 |
| Twitter | 1561 | 173 | 3127 | 346 | 1560 | 173 |

FIG. 6

Table 2

| Category | Model | Restaurant | | Laptop | | Twitter | |
|---|---|---|---|---|---|---|---|
| | | Acc | Macro-F1 | Acc | Macro-F1 | Acc | Macro-F1 |
| BERT | BERT-SPC(Song et al., 2019) | 84.5 | 77.0 | 79.0 | 75.0 | 73.55 | 72.14 |
| | AEN-BERT(Song et al., 2019) | 83.1 | 73.8 | 79.9 | 76.3 | 74.71 | 73.13 |
| BERT+DT* | TD-GAT-BERT(Huang and Carley, 2019) | 83.0 | - | 80.1 | - | - | - |
| BERT+RDT° | R-GAT+BERT(Wang et al., 2020) | 86.60 | 81.35 | 78.21 | 74.07 | 76.15 | 74.88 |
| Ours | BERT-Single | 84.46 | 78.04 | 79.47 | 75.82 | 75.29 | 73.74 |
| | BERT+GAT | 85.36 | 78.84 | 80.56 | 77.47 | 75.00 | 73.43 |
| | BERT+GCN | 85.18 | 79.08 | 79.47 | 75.98 | 74.42 | 73.49 |
| | BERT+GDT | 86.79 | 81.48 | 81.35 | 78.27 | 75.58 | 74.32 |
| | Roberta+GDT | 88.48 | 82.42 | 84.17 | 81.55 | 76.45 | 75.37 |

* DT: Dependency Tree
° RDT: Reshaped Dependency Tree

FIG. 7

METHOD AND SYSTEM FOR ASPECT-LEVEL SENTIMENT CLASSIFICATION BY GRAPH DIFFUSION TRANSFORMER

CROSS-REFERENCES

This application claims priority to and the benefit of, pursuant to 35 U.S.C. § 119(e), U.S. provisional patent application Ser. No. 63/082,105, filed Sep. 23, 2020, titled "METHOD AND SYSTEM FOR ASPECT-LEVEL SENTIMENT CLASSIFICATION BY GRAPH DIFFUSION TRANSFORMER" by Xiaochen Hou, Jing Huang, Guangtao Wang, Xiaodong He, Bowen Zhou, which is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entirety and to the same extent as if each reference were individually incorporated by reference.

FIELD OF THE DISCLOSURE

The present disclosure relates generally to sentiment analysis of text, and more specifically related to methods and systems for aspect-level sentiment classification using a graph diffusion transformer (GDT).

BACKGROUND OF THE DISCLOSURE

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Aspect-level sentiment classification is a fine-grained sentiment analysis task, which aims to identify the sentiment polarity (e.g., positive, negative, or neutral) of a specific aspect term appearing in a review. A review may be, for example: "Despite a slightly limited menu, everything prepared is done to perfection, ultra fresh and a work of food art." The sentiment polarity of the aspect terms "menu" and "food" in the review are negative and positive, respectively. This task has many applications, such as assisting customers to make purchase decisions on e-commerce websites.

Recent studies have shown that interactions between the aspect term and its context are crucial to identify the sentiment polarity towards the given aspect term. Most approaches only consider semantic information from the context words and utilize attention mechanism to learn such interactions. However, it has been shown that syntactic information obtained from dependency parsing is very effective in capturing long-range syntactic relations that are obscure from the surface form. Recent successful approaches to learn syntax-aware representations employed graph neural network (GNN) model over dependency trees, which allows the message passing between the aspect term and the context words in a syntactical manner. One of the popular GNN model is graph attention network (GAT). In one layer GAT, GAT computes attention scores only on direct one-hop neighbors. When the aspect term is far away from its opinion context, more GAT layers are needed. For example, in FIG. 1, there's a four-hop distance on the dependency tree between the aspect term "soup" and the opinion words "not tasty." Therefore, a four-layer GAT is needed in this case. Although deeper GAT could still pass information among distant nodes by stacking many layers, most of previous work already indicated that GNN models with two layers achieve the best performance and deeper GAT do not bring additional gain due to over-smoothing problem.

Therefore, an unaddressed need exists in the art to learn effect between distant nodes to classify aspect-level sentiment accurately.

SUMMARY OF THE DISCLOSURE

In certain aspects, the present disclosure relates to a system. In certain embodiments, the system includes a computing device, and the computing device has a processer and a storage device storing computer executable code. The computer executable code, when executed at the processor, is configured to: receive a sentence having an aspect term and context, the aspect term having a classification label; convert the sentence into a dependency tree graph; calculate an attention matrix of the dependency tree graph based on one-hop attention between any two of a plurality of nodes in the dependency tree graph; calculate graph attention diffusion from multi-hop attention between any two of the plurality of nodes in the dependency tree graph based on the attention matrix; obtain updated embedding of the dependency tree graph using the graph diffusion attention; classify the aspect term based on the updated embedding of the dependency tree graph to obtain predicted classification of the aspect term; calculate loss function based on the predicted classification of the aspect term and the classification label of the aspect term; and adjust parameters of models in the computer executable code based on the loss function.

In certain embodiments, the computer executable code has an embedding module, attention module, and a dependency tree module. The embedding module, the attention module and the dependency tree module are configured to convert the sentence into the dependency tree graph by: embedding, by the embedding module, the aspect term to obtain an aspect term embedding $X_t$; converting, by the attention module, the aspect term embedding to aspect term feature $H_\alpha$ by: $\alpha = \text{softmax}(\sigma(W_2 \sigma(W_1 X_t^T)))$ and $H_\alpha = \alpha X_t$, wherein $\alpha \in \mathbb{R}^{1 \times m}$, $H_\alpha \in \mathbb{R}^{1 \times d}$, m is a positive integer indicating a number of embedding tokens of the aspect term, d is a positive integer indicating dimensions of embedding, $X_t^T$ is the transposition of $X_t$, and $\sigma$ denotes tanh activation function; embedding, by the embedding module, the context to obtain context embeddings $X_c$, each of the context embeddings corresponding to a word or a punctuation in the sentence that are not the aspect term; parsing, by the dependency tree module, the sentence into a dependency tree; and combining, by the dependency tree module, the aspect term feature $H_\alpha$, the context embeddings $X_c$, and the dependency tree into the dependency tree graph, wherein each node of the dependency tree graph has a feature corresponding to one of the aspect term embedding and the context embeddings.

In certain embodiments, the computer executable code has a plurality of graph diffusion transformer (GDT) layers, and l-th GDT layer of the plurality of GDT layers is configured to calculate the attention matrix by: calculating an attention score $s_{i,j}^{(l)}=\sigma_2(v^*\sigma_1(W_h h_i^{(l)} \| W_t h_j^{(l)}))$ for nodes i and node j in the dependency tree graph, where $W_h$, $W_t \in \mathbb{R}^{d \times d}$ and $v \in \mathbb{R}^{2 \times d}$ are learnable weights, $h_i^{(l)}$ is a feature of node i at the l-th GDT layer, $\|$ is a concatenation operation, $\sigma_1$ is a ReLU activation function, and $\sigma_2$ is a LeakyReLU activation function; obtaining attention score matrix $S^{(l)}$ by:

$$S^{(l)} = \begin{cases} s_{i,j}^{(l)}, & \text{if there is an edge between } i \text{ and } j \\ -\infty, & \text{otherwise} \end{cases};$$

and calculating the attention matrix $A^{(l)}$ by: $A^{(l)}$=softmax $(S^{(l)})$.

In certain embodiments, the l-th GDT layer is configured to calculate the graph attention diffusion attention by: calculating diffusion attention matrix $\tilde{A}^{(l)}$ by: $\tilde{A}^{(l)} = \Sigma_{hop=0}^{\infty} \alpha (1-\alpha)^{hop} A^{hop(l)}$, $\alpha \in (0, 1]$, where hop is a positive integer in a range of 2-12, and $\theta_{hop}$ is an attention decay factor; and calculating the graph attention diffusion $\overline{H^{(l+1)}}$ by: $\overline{H^{(l+1)}} = \tilde{A}^{(l)} H^{(l)}$, where $H^{(l)}$ is input dependency tree graph embedding of the l-th layer.

In certain embodiments, the l-th GDT layer is configured to approximate the graph attention diffusion $\overline{H^{(l+1)}}$ by: $Z^{(k+1)}=(1-\alpha)A^{(l)}Z^k+\alpha H^{(l)}$; $Z^{(0)}=H^{(l)}$; and $\overline{H^{(l+1)}}=Z^k$, where k is an integer in a range of [0-K].

In certain embodiments, K is a positive integer in a range of 2-12, and l is a positive integer in a range of 2-24.

In certain embodiments, the l-th GDT layer is configured to obtain the updated embedding of the independency tree graph by: concatenating the graph attention diffusions $\overline{H^{(l+1)}}$ of a plurality of heads to obtain concatenated attention diffusion $\hat{H}^{(l+1)}$ by: $\hat{H}^{(l+1)}$=Concat$(h_1^{(l+1)}, \ldots, h_T^{(l+1)})W^0$, wherein each of $h_1^{(l+1)}, \ldots, h_T^{(l+1)})$ corresponds to one of the plurality of graph attention diffusions $\overline{H^{(l+1)}}$, $W^0 \in \mathbb{R}^{Td_h \times Td_h}$, T is a number of heads, $d_h$ is hidden dimensions of each head, and $d_h$=d/T; performing $\hat{H}^{l+1}=\hat{H}^{(l+1)}$+ Norm$(H^{(l)})$; and performing $H^{(l+1)}=W_2$ $(\sigma(W_1\text{Norm}(\hat{H}^{l+1})))+\hat{H}^{l+1}$, wherein $W_1 \in \mathbb{R}^{d \times d}$ and $W_2 \in \mathbb{R}^{d \times d}$ are trainable matrix, and $\sigma$ represents ReLU activation function, where $H^{(l+1)}$ is the updated embedding of the independency tree graph.

In certain embodiments, the computer executable code comprises a classifier, and the classifier is configured to classify the aspect term by: $\hat{y}=W_2\sigma(W_1\hat{H}_t^T)$, where $W_2 \in \mathbb{R}^{C \times d_{out}}$ and $W_1 \in \mathbb{R}^{d_{out} \times d_h}$ are learnable weight matrix, C is class number of the classification, $\sigma$ is tanh activation function, $\hat{H}_t$ is aspect term embedding extracted from the updated embedding $H^{(l+1)}$, $\hat{H}_t^T$ is transpose of $\hat{H}_t^T$, and $d_{out}$ is dimensions of $H^{(l+1)}$.

In certain embodiments, the classifier is configured to calculate the loss function by: loss=$-\Sigma_{c=1}^{C} y \log \hat{y} + \lambda \|\theta\|^2$, where $\lambda$ is a coefficient for L2-regularization, $\theta$ are parameters that need to be regularized, and y is the label of the aspect term.

In certain embodiments, the computer executable code is further configured to: receive a query sentence and a query aspect term from the query sentence; convert the query sentence into a query dependency tree graph; calculate a query attention matrix of the query dependency tree graph based on one-hop attention between any two of a plurality of the nodes in the query dependency tree graph; calculate a query graph attention diffusion from the query attention matrix; obtain updated query embedding of the query dependency tree graph using the query graph attention diffusion; classify the query aspect term based on the updated query embedding of the query dependency tree graph to obtain predicted classification of the query aspect term; and label the query aspect term with the predicted classification.

In certain aspects, the present disclosure relates to a method. In certain embodiments, the method includes: receiving, by a computing device, a sentence having an aspect term and context, the aspect term having a classification label; converting, by the computing device, the sentence into a dependency tree graph; calculating, by the computing device, an attention matrix of the dependency tree graph based on one-hop attention between any two of the plurality of the nodes in the dependency tree graph; calculating, by the computing device, graph attention diffusion from multi-hop attention between any two of the plurality of nodes in the dependency tree graph based on the attention matrix; obtaining, by the computing device, updated embedding of the dependency tree graph using the graph attention diffusion; classifying, by the computing device, the aspect term based on the updated embedding of the dependency tree graph to obtain predicted classification of the aspect term; calculating, by the computing device, loss function based on the predicted classification of the aspect term and the classification label of the aspect term; and adjusting, by the computing device, parameters of models in the computer executable code.

In certain embodiments, the step of converting the sentence into the dependency tree graph includes: embedding the aspect term to obtain an aspect term embedding $X_t$; converting the aspect term embedding to aspect term feature $H_\alpha$ by: $\alpha$=softmax $(\sigma(W_2\sigma(W_1 X_t^T)))$ (1) and $H_\alpha=\alpha X_t$ (2), wherein $\alpha \in \mathbb{R}^{1 \times m}$, $H_\alpha \in \mathbb{R}^{1 \times d}$, m is a positive integer indicating a number of embedding tokens of the aspect term, d is a positive integer indicating dimensions of embedding, $X_t^T$ is the transposition of $X_t$, and $\sigma$ denotes tanh activation function; embedding the context to obtain context embeddings $X_c$, each of the context embeddings corresponding to a word or a punctuation in the sentence that are not the aspect term; parsing the sentence into a dependency tree; and combining the aspect term feature $H_\alpha$, the context embeddings $X_c$, and the dependency tree into the dependency tree graph, wherein each node of the dependency tree graph has a feature corresponding to one of the aspect term embedding and the context embeddings.

In certain embodiments, the step of calculating the graph attention matrix includes: calculating an attention score $s_{i,j}^{(l)}=\sigma_2(v^*\sigma_1(W_h h_i^{(l)} \| W_t h_j^{(l)}))$ for nodes i and node j in the dependency tree graph, wherein $W_h$, $W_t \in \mathbb{R}^{d \times d}$ and $v \in \mathbb{R}^{2 \times d}$ are learnable weights, $h_i^{(l)}$ is a feature of node i at l-th graph diffusion attention (GDT) layer of a plurality of GDT layers, $\|$ is a concatenation operation, $\sigma_1$ is a ReLU activation function, and $\sigma_2$ is a LeakyReLU activation function; obtaining attention score matrix $S^{(l)}$ by:

$$S^{(l)} = \begin{cases} s_{i,j}^{(l)}, & \text{if there is an edge between } i \text{ and } j \\ -\infty, & \text{otherwise} \end{cases};$$

calculating the attention matrix $A^{(l)}$ by: $A^{(l)}$=softmax$(S^{(l)})$; calculating diffusion attention matrix $\tilde{A}^{(l)}$ by: $\tilde{A}^{(l)} = \Sigma_{hop=0}^{\infty} \alpha (1-\alpha)^{hop} A^{hop(l)}$, $\alpha \in (0, 1]$, wherein hop is a positive integer in a range of 2-12, and $\theta_{hop}$ is an attention decay factor; and calculating the graph attention diffusion $\overline{H^{(l+1)}}$ by: $\overline{H^{(l+1)}} = \tilde{A}^{(l)} H^{(l)}$, wherein $H^{(l)}$ is input dependency tree graph embedding of the l-th GDT layer.

In certain embodiments, the $\overline{H^{(l+1)}}$ is approximated by: $Z^{(k+1)}=(1-\alpha)A^{(l)}Z^k+\alpha H^{(l)}$; $Z^{(0)}=H^{(l)}$; and $\overline{H^{(l+1)}}=Z^k$, where k is an integer in a range of [0-K].

In certain embodiments, the step of obtaining the updated embedding of the independency tree graph includes: concatenating the graph attention diffusions $\overline{H^{(l+1)}}$ of a plurality of heads to obtain concatenated attention diffusion $\hat{H}^{(l+1)}$ by: $\hat{H}^{(l+1)}=\text{Concat}(h_1^{(l+1)}, \ldots, h_T^{(l+1)})W^o$, where each of $h_1^{(l+1)}, \ldots, h_T^{(l+1)}$ corresponds to one of the plurality of graph attention diffusions $\overline{H^{(l+1)}}$, $W^o = \mathbb{R}^{Td_h \times Td_h}$, T is a number of heads, $d_h$ is hidden dimensions of each head, and $d_h=d/T$; performing $\tilde{H}^{l+1}=\hat{H}^{(l+1)}+\text{Norm}(H^{(l)})$; and performing $H^{(l+1)}=W_2(\sigma(W_1\text{Norm}(\tilde{H}^{(l+1)})))+\hat{H}^{(l+1)}$, where $W_1 = \in \mathbb{R}^{d \times d}$ and $W_2 = \in \mathbb{R}^{d \times d}$ are trainable matrix, $\sigma$ represents ReLU activation function, and $H^{(l+1)}$ is the updated embedding of the independency tree graph.

In certain embodiments, the step of classifying the aspect term includes: $\hat{y}=W_2\sigma(W_1\hat{H}_t^T)$, where $W_2 = \in \mathbb{R}^{C \times d_{out}}$ and $W_1 = \in \mathbb{R}^{d_{out} \times d_h}$ are learnable weight matrix, C is class number of the classification, $\sigma$ is tanh activation function, $\hat{H}_t$ is aspect term embedding extracted from the updated embedding $H^{(l+1)}$, $\hat{H}_t^T$ is transpose of $\hat{H}_t$, and $d_{out}$ is dimensions of $H^{(l+1)}$.

In certain embodiments, the loss function is calculated by: $\text{loss}=-\Sigma_{c=1}^C y \log \hat{y}+\lambda\|\theta\|^2$, where $\lambda$ is a coefficient for L2-regularization, $\theta$ are parameters that need to be regularized, and y is the label of the aspect term.

In certain embodiments, the method further includes: receiving a query sentence and a query aspect term from the query sentence; converting the query sentence into a query dependency tree graph; calculating a query attention matrix of the query dependency tree graph based on one-hop attention between any two of a plurality of the nodes in the query dependency tree; calculating a query graph attention diffusion from the query attention matrix; obtaining updated query embedding of the query dependency tree graph using the query graph attention diffusion; classifying the query aspect term based on the updated query embedding of the query dependency tree graph to obtain predicted classification of the query aspect term; and labeling the query aspect term with the predicted classification.

In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 4 schematically depicts a training process for a sentiment classification application according to certain embodiments of the present disclosure.

FIG. 6, Table 1 shows datasets for comparing the model according to certain embodiments of the present disclosure and other related models.

FIG. 7, Table 2 shows comparison of the model according to certain embodiments of the present disclosure with various baselines.

DETAILED DESCRIPTION

Figure 1:
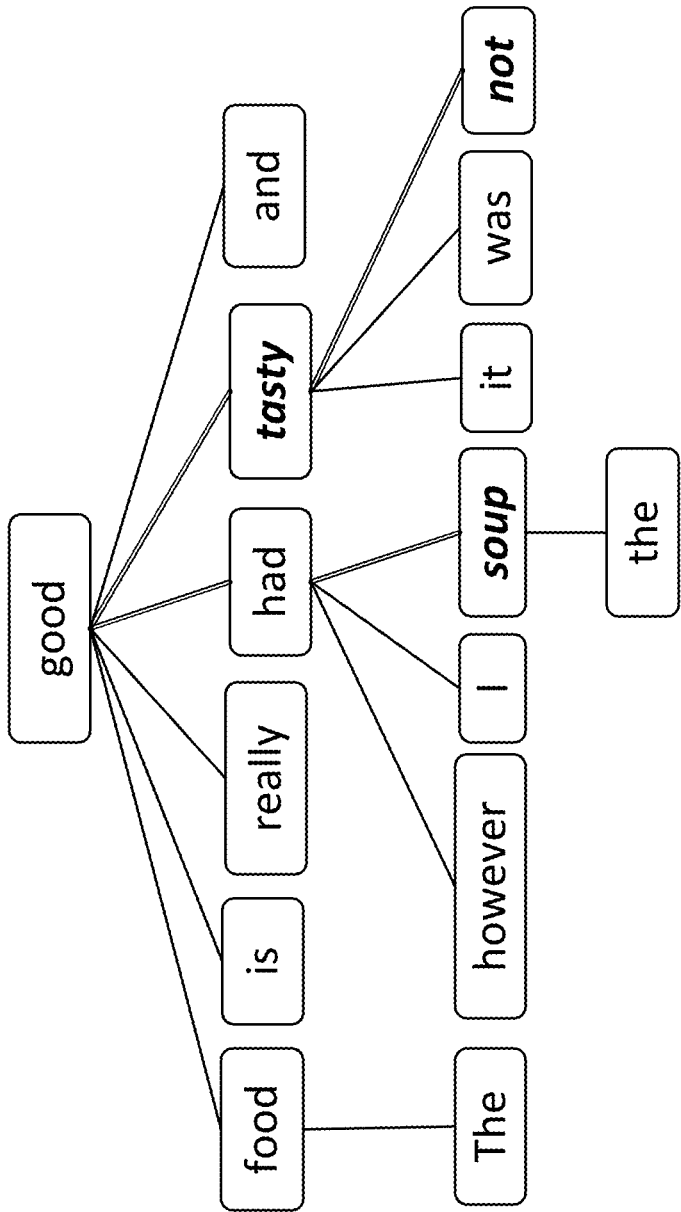
FIG. 1 schematically depicts a dependency tree of a sentence according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a" "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples any-where in this specification including examples of any terms discussed herein is illustrative only, and in no way limits the scope and meaning of the disclosure or of any exemplified term. Likewise, the disclosure is not limited to various embodiments given in this specification.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

Overview of the Model

Figure 2:
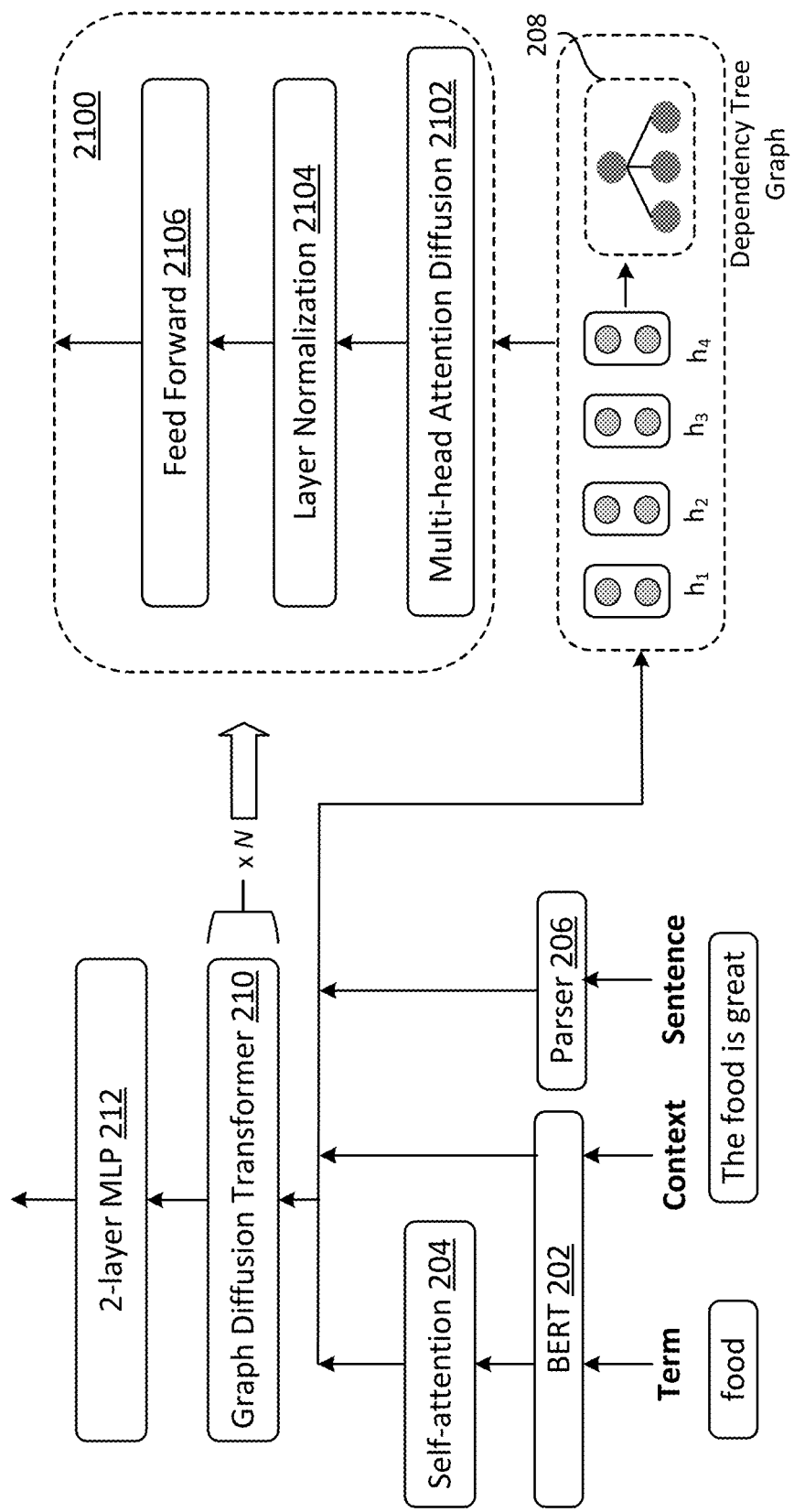
FIG. 2 schematically depicts an architecture of a GDT model according to certain embodiments of the present disclosure.

In certain aspects, the present disclosure provides a graph diffusion transformer (GDT) model for aspect term sentiment classification. FIG. 2 schematically depicts an overall architecture of the GDT model according to certain embodiments of the present disclosure. As shown in FIG. 2, for a training input of term-sentence pair, all the words in the sentence except for the aspect term are considered as context words. The aspect term is "food," and the sentence is "The food is great," and the context is "The is great." The aspect term is embedded using BERT 202, the term embeddings of the aspect term may have several embedding tokens, and then the self-attention 204 processes the term embeddings to form one term feature, which is a single vector representing the aspect term. The context is also embedded using the BERT 202 to form embeddings of the context words and optionally the punctuations of the sentence. As described above, the BERT 202 may use a token as an embedding unit, and one context word may correspond to several token embeddings. The token embeddings for each context word are further averaged to obtain the final context embeddings, where each word or optionally each punctuation in the context corresponds to one context embedding. The disclosure further uses a parser 206 to parse the sentence into dependency tree. The dependency tree, the term feature, and the context embeddings are combined to form the dependency tree graph 208, where the parser 206 provide the tree structure of the sentence, and the aspect feature and the context embedding provide features for the nodes in the dependency tree graph 208. Each node corresponds to one word or a punctuation in the sentence, and the features of the nodes are represented by embedding vectors such as $h_1$, $h_2$, $h_3$, and $h_4$. The dependency tree graph 208 is then processed by the graph diffusion transformer (GDT) 210. The GDT 210 updates the node embeddings of the dependency tree graph 208, and updated node embeddings include updated aspect term embedding (updated term feature). The GDT 210 has N number of GDT layers 2100 linked tandemly. The GDT layers 2100 have the same structure, but parameters of different GDT layers 2100 would be different after training. As shown in FIG. 2, each GDT layer 2100 include sequentially a multi-head attention diffusion 2102, a layer normalization 2104 and a feed forward 2106. The updated term feature is outputted from the last GDT layer 2100 to a 2-layer MLP 212. The 2-layer MLP 212 makes prediction based on the updated term feature. The prediction can be, for example a classification of positive, negative, and neutral. During training, the prediction for the aspect term is compared with the true label of the aspect term to calculate a loss function, and the loss function is used to adjust the parameters of the BERT 202, the self-attention 204, the GDT 210 and the 2-layer MLP 212. The training may be performed several times for the same aspect-sentence pair, and may be performed using different aspect-sentence pairs. When the model is well-trained, the well-trained model can be used for prediction of an aspect-sentence pair that does not have label/classification of the aspect term. During prediction, classification by the 2-layer MLP 212 is the result, and calculation of loss function may not be necessary. The prediction of the aspect term can then be used to label the aspect term-sentence pair. In certain embodiments, the aspect term-sentence pair for labeling and the aspect term-sentence pair for training are preferably in the same field. For example, both of the training pairs and prediction pairs may be customer comments on products in an ecommerce platform.

Encoder for Aspect Term and Context

BERT Encoder. The disclosure uses the pre-trained BERT model 202 as the encoder to get initial representations of the aspect term and the context words. First, the disclosure constructs the input as "[CLS]+Sentence+[SEP]+Term+[SEP]" and feeds the input into the BERT 202, where [CLS] is the class token placed at the beginning of the input sample, [SEP] is a separator, "Sentence" is the tokens of the sentence, and "Term" is the token of the aspect term from the "sentence." Note that for simplicity, the disclosure considers the aspect term as one single word. Suppose a sentence consists of n words (thus there are n−1 context words) and the BERT output of the term word has m sub-tokens. Then, the outputs of sentence words from BERT are treated as the embedding of context words $X_c \in \mathbb{R}^{(n-1) \times d_B}$. Similarly, term representation $X_t \in \mathbb{R}^{m \times d_B}$ is obtained. Here $\mathbb{R}$ is a real number, and $d_B$ is the dimension of the BERT output.

Self-attention layer. After obtaining the embedding of the aspect term $X_t$, the disclosure applies self-attention 204 to summarize the information carried by each sub-token of the aspect term and get a single feature representation as the term feature. In certain embodiments, the disclosure utilizes a two-layer Multi-Layer Perceptron (MLP) to compute the scores of the sub-tokens and get weighted sum over all sub-tokens. Each of the scores indicates importance of the corresponding sub-token, and the weighted sum refers to summation of the representations of the sub-tokens according to their importance. This is formulated as follows:

$$\alpha = \text{softmax}(\sigma(W_2 \sigma(W_1 X_t^T))) \quad (1)$$

$$H_\alpha = \alpha X_t \quad (2)$$

where $\alpha \in \mathbb{R}^{1 \times m}$, $H_\alpha$ is the weighted sum or the aspect term representation, $H_\alpha \in \mathbb{R}^{1 \times d_B}$, $X_t^T$ is the transposition of $X_t$, and $\sigma$ denotes tanh activation function. The bias vectors are not shown here for simplicity.

GDT Layer

The GDT model 210 is designed to allow each node to interact with its multi-hop neighbors in one single layer, and it takes the dependency tree structure into consideration when calculating the attention score between any pair of nodes. When the disclosure stacks multiple GDT layers 2100, it alleviates the over-smoothing problem that deeper GAT model has.

The computation involves in one GDT layer, the l-th GDT layer 2100, is as follows: the disclosure first computes one-hop attention score matrix and then according to the one-hop matrix, calculate the multi-hop attention matrix (diffusion attention matrix) and attentively update each node's feature. The disclosure uses $H_\alpha$ as the aspect term representation, $H_c$ (i.e., $X_c$) as the context representation. The combination of the aspect term representation $H_\alpha$ and the context representation $H_c$ are the node embedding or node representation $H^{(l)}$.

One-hop attention matrix. In the layer 1 of the stacked GDT layers 210, the GDT layer 1 first uses the node embeddings $H^{(l)}$ to calculate the attention score $s_{i,j}^{(l)}$ between the node i and its one-hop neighbor j as:

$$s_{i,j}^{(l)} = \sigma_2(v^* \sigma_1(W_h h_i^{(l)} \| W_t h_j^{(l)})) \quad (3)$$

where $W_h, W_t \in \mathbb{R}^{d \times d}$ and $v \in \mathbb{R}^{2 \times d}$ are learnable weights. $h_i^{(l)}$ denotes the feature of node i at the layer l, which comes from the node embeddings $H^{(l)}$. $\|$ represents the concatenation operation. $\sigma_1$ and $\sigma_2$ are ReLU and LeakyReLU activation function respectively.

Then the disclosure obtains one-hop attention score matrix (or briefly attention score matrix) $S^{(l)}$ as:

$$S^{(l)} = \begin{cases} s_{i,j}^{(l)}, & \text{if there is an edge between } i \text{ and } j \\ -\infty, & \text{otherwise} \end{cases}.$$

Next, we perform row-wise softmax operation on $S^{(l)}$ and get the one-hop attention matrix (or briefly attention matrix) $A^{(l)}$:

$$A^{(l)} = \text{softmax}(S^{(l)}). \quad (4)$$

Multi-hop attention matrix (or diffusion attention matrix). The multi-hop attention matrix $\tilde{A}^{(l)}$ could be estimated by the one-hop attention matrix $A^{(l)}$ as follows:

$$\tilde{A}^{(l)} = \Sigma_{i=0}^{\infty} \alpha (1-\alpha)^i A^{i(l)}, \alpha \in (0,1] \quad (5),$$

where $\alpha$ is the attention decay factor. $A^{i(l)}$ is the i-th power of $A^{(l)}$, representing i-hop attention score matrix. With $\tilde{A}^{(l)}$, the disclosure can update node features or node embeddings as:

$$\overline{H^{(l+1)}} = \tilde{A}^{(l)} H^{(l)} \quad (6)$$

However, computing the power of $A^{(l)}$ is very expensive and could be the bottleneck during training process. Thus, the disclosure approximates $\overline{H^{(l+1)}}$ by:

$$Z^{(k+1)} = (1-\alpha) A^{(l)} Z^k + \alpha H^{(l)} \quad (7),$$

$$Z^{(0)} = H^{(l)} \quad (8), \text{ and}$$

$$\overline{H^{(l+1)}} = Z^k \quad (9).$$

Here $\alpha$ is a predefined constant in a range of 0-0.5. In certain embodiments, $\alpha$ is in a range of 0.05 to 0.25. In certain embodiments, $\alpha$ is in a range of 0.1 to 0.2. In certain embodiments, $\alpha$ is 0.1 or 0.15. $0 \leq k \leq K$. K is the hop number, and is a positive integer in a range of 3-10. In certain embodiments, K is in a range of 4-8. In certain embodiments, K is 6. The values of $\alpha$ and K may vary according to the size and features of the knowledge graph 332. For example, assume that $\alpha$ is 0.1 and K is 6, then $Z^{(0)} = H^{(l)}$, $Z^{(1)} = 0.9 A^{(l)} Z^{(0)} + 0.1 Z^{(0)}$, $Z^{(2)} = 0.9 A^{(l)} Z^{(1)} + 0.1 Z^{(0)}$, $Z^{(3)} = 0.9 A^{(l)} Z^{(2)} + 0.1 Z^{(0)}$, $Z^{(4)} = 0.9 A^{(l)} Z^{(3)} + 0.1 Z^{(0)}$, $Z^{(5)} = 0.9 A^{(l)} Z^{(4)} + 0.1 Z^{(0)}$, $Z^{(6)} = 0.9 A^{(l)} Z^{(5)} + 0.1 Z^{(0)}$, and $Z^{(6)}$ is the graph attention diffusion, which is the approximation of $\overline{H^{(l+1)}}$ or $\tilde{A}^{(l)} H^{(l)}$. As described above, the calculation of the graph attention diffusion $\overline{H^{(l+1)}}$ can also be performed using the equations (5) and (6). However, because the $Z^{(1)}$, $Z^{(2)}$, $Z^{(3)}$, $Z^{(4)}$, $Z^{(5)}$, and $Z^{(6)}$ are calculated recursively, the calculation is much faster than the calculation using the equations (7), (8) and (9).

The disclosure defines the feature aggregation and update process as:

$$\overline{H^{(l+1)}} = \text{Attn\_Diffusion}(H^{(l)}, \mathcal{G}) \quad (10),$$

where $\mathcal{G}$ denotes the dependency tree graph.

Multi-head Attention Diffusion Layer. Instead of performing a single attention function, the disclosure applies multi-head attention mechanism that allows the model to jointly attend to information at different positions:

$$\hat{H}^{(l+1)} = \text{Concat}(h_1^{(l+1)}, \ldots, h_T^{(l+1)}) W^O \quad (11),$$

$$h_i^{(l+1)} = \text{Attn\_Diffusion}(h_i^{(l)}, \mathcal{G}) \quad (12)$$

where $W^O = \in \mathbb{R}^{T d_h \times T d_h}$, T is the head number, $d_h$ is the hidden dimension of each head. $d_h$ and d are constrained by $d_h = d/T$, and $h_i^{(l+1)}$ here for each head is equivalent to $\overline{H^{(l+1)}}$.

Layer Normalization and Feed Forward. Next, the disclosure applies the layer normalization operation on $H^{(l)}$ and add the normalized feature to $\hat{H}^{l+1}$ as the residual connection:

$$\tilde{H}^{l+1} = \hat{H}^{l+1} + \text{Norm}(H^{(l)}) \quad (13),$$

where Norm denotes the layer normalization.

Then, instead of directly using activation function on $H^{(l)}$ in GAT, the disclosure applies a learnable feed-forward layer and then add a residual connection as well:

$$H^{(l+1)} = W_2(\sigma(W_1 \text{Norm}(\tilde{H}^{l+1}))) + \tilde{H}^{l+1} \quad (14)$$

where $W_1 = \in \mathbb{R}^{d \times d}$ and $W_2 = \in \mathbb{R}^{d \times d}$ are trainable matrix and $\sigma$ represents ReLU activation function.

Classifier. The disclosure extracts the aspect term node feature $\hat{H}_t \in \mathbb{R}^{d \times d}$ from $\hat{H}_{out}$, which is the output of the last GDT layer. Then the disclosure feeds it into a two-layer MLP to calculate the final classification scores:

$$\hat{y} = W_2 \sigma(W_1 \hat{H}_t^T) \quad (15),$$

where $W_2 = \in \mathbb{R}^{C \times d_{out}}$ and $W_1 = \in \mathbb{R}^{d_{out} \times d_h}$ denote the learnable weight matrix, C is the class number, which is 3 in certain embodiments of the present disclosure, $\sigma$ refers to tanh activation function.

In certain embodiments, the disclosure uses cross entropy as the loss function:

$$\text{loss} = -\Sigma_{c=1}{}^C y \log \hat{y} + \lambda \|\theta\|^2 \quad (16),$$

where $\lambda$ is the coefficient for L2-regularization, $\theta$ denotes the parameters that need to be regularized, y is the true label, and $\hat{y}$ is the predicted result.

Implementation of the Present Disclosure in a Computing Device

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Figure 3B:
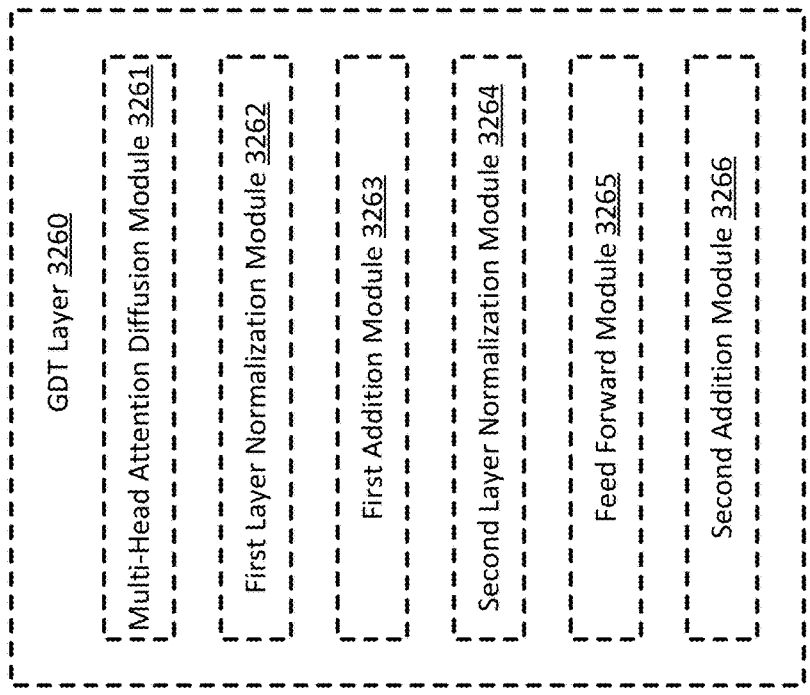
FIG. 3B schematically depicts a GDT block according to certain embodiments of the present disclosure.
Figure 3A:
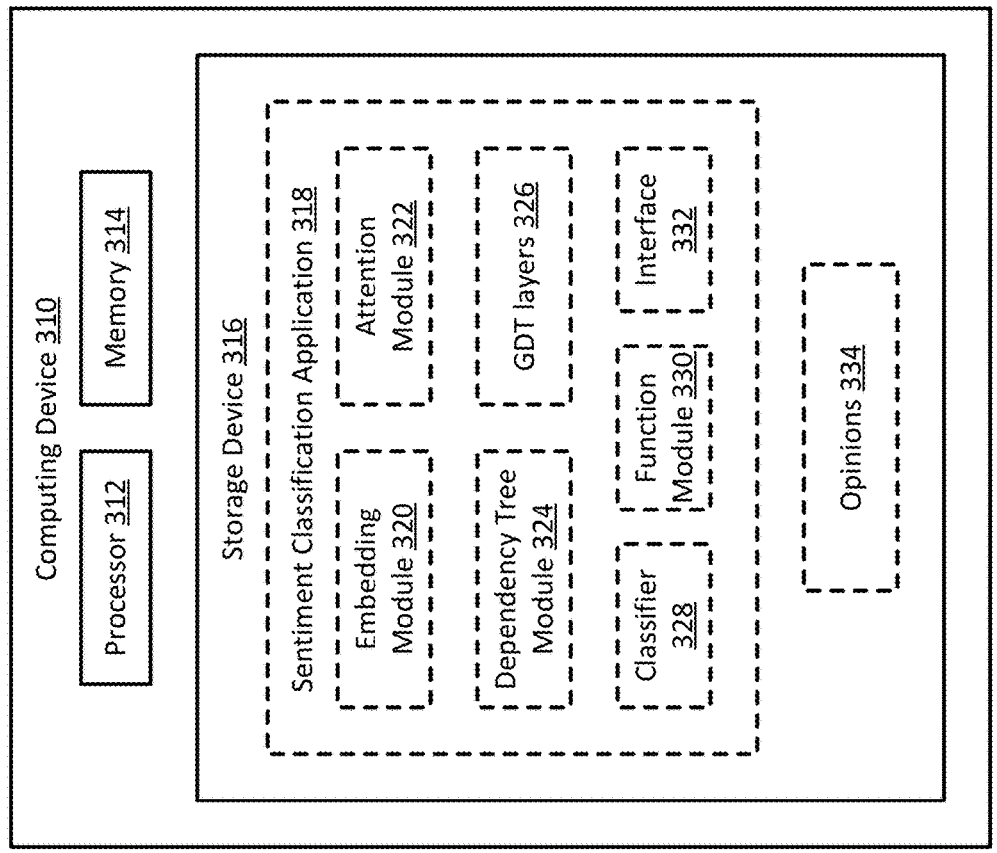
FIG. 3A schematically depicts a GDT system according to certain embodiments of the present disclosure.

FIG. 3A schematically depicts an aspect-level sentiment classification system according to certain embodiments of the present disclosure. As shown in FIG. 3A, the system 300 includes a computing device 310. In certain embodiments, the computing device 310 may be a server computer, a cluster, a cloud computer, a general-purpose computer, a headless computer, or a specialized computer, which provides note classification or knowledge graph completion services. The computing device 310 may include, without being limited to, a processor 312, a memory 314, and a storage device 316. In certain embodiments, the computing device 310 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 312 may be a central processing unit (CPU) which is configured to control operation of the computing device 310. The processor 312 can execute an operating system (OS) or other applications of the computing device 310. In certain embodiments, the computing device 310 may have more than one CPU as the processor, such as two CPUs, four CPUs, eight CPUs, or any suitable number of CPUs. The memory 314 can be a volatile memory, such as the random-access memory (RAM), for storing the data and information during the operation of the computing device 310. In certain embodiments, the memory 314 may be a volatile memory array. In certain embodiments, the computing device 310 may run on more than one memory 314. The storage device 316 is a non-volatile data storage media for storing the OS (not shown) and other applications of the computing device 310. Examples of the storage device 316 may include non-volatile memory such as flash memory, memory cards, USB drives, hard drives, floppy disks, optical drives, solid-state drive, or any other types of data storage devices. In certain embodiments, the computing device 310 may have multiple storage devices 316, which may be identical storage devices or different types of storage devices, and the applications of the computing device 310 may be stored in one or more of the storage devices 316 of the computing device 310.

In this embodiment, the processor 312, the memory 314, and the storage device 316 are component of the computing device 310, such as a server computing device. In other embodiments, the computing device 310 may be a distributed computing device and the processor 312, the memory 314, and the storage device 316 are shared resources from multiple computing devices in a pre-defined area.

The storage device 316 includes, among other things, a sentiment classification application 318 and opinions 334. The sentiment classification application 318 is configured to train its model structure using aspect-level sentiment labels of the opinion 332, and make predictions for the opinions that do not have aspect-level sentiment labels. The opinions 334 is optional for the computing device 310, as long as the opinions stored in other devices is accessible to the sentiment classification application 318.

As shown in FIG. 3A, the sentiment classification application 318 includes an embedding module 320, an attention module 322, a dependency tree module 324, graph diffusion transformer (GDT) layers 326, a classifier 328, a function module 330, and an interface 332. In certain embodiments, the sentiment classification application 318 may include other applications or modules necessary for the operation of the sentiment classification application 318. It should be noted that the modules 320-332 are each implemented by computer executable codes or instructions, or data table or databases, or a combination of hardware and software, which collectively forms one application. In certain embodiments, each of the modules may further include sub-modules. Alternatively, some of the modules may be combined as one stack. In other embodiments, certain modules may be implemented as a circuit instead of executable code. In certain embodiments, the modules can also be collectively named a model, which can be trained using training data, and after well trained, can be used to make a prediction.

The embedding module 320 is configured to embed an aspect term and context of an opinion from the opinions 334 to obtain aspect term embedding $X_t$ and context embedding $X_c$, send the aspect term embedding $X_t$ to the attention module 322, and send the context embedding $X_c$ to the dependency tree module 324. In certain embodiments, the opinion is a sentence, and the opinion includes the aspect term, which is also a word in the sentence. Before feeding into the embedding encoder, the embedding module 320 may prepare the sentence in the form of "[CLS]+Sentence+[SEP]+Term+[SEP]." After embedding by the embedding module 320, the outputted embedding includes the term representation $X_t$ and the context words embedding $X_c$. The term representation $X_t$ may have embeddings for one or a few sub-tokens. Each vector in the vector matrix $X_c$ corresponds to one word or a punctuation in the context. When a context word is separated to a few tokens, the token embedding is further averaged, such that each context word only has one corresponding vector in the context words embedding $X_c$. The embedding may be performed, for example, by deep bidirectional transformers (BERT), robustly optimized BERT pretraining approach (RoBERTa), or Word2vec.

The attention module 322 is configured to, upon receiving the aspect term embedding $X_t$ from the embedding module 320, perform a two-layer MLP on the aspect term embedding to obtain the term feature $H_\alpha$, and send the term feature $H_\alpha$ to the dependency tree module 324. In certain embodiments, the attention module 322 performs the two-layer MLP using the equations (1) and (2). In certain embodiments, the aspect term may be one or two words, and one aspect term word may correspond to one or multiple tokens. By operation of the attention module 322, the one or more embedding tokens of the aspect term $X_t$ is converted to the one embedding-term feature $H_\alpha$. As a result, the dimension of the term feature $H_\alpha$ is the same as the dimension of each context word embedding in the context words embedding $X_c$.

The sentence is available to the dependency tree module 324, and the dependency tree module 324 is configured to parse the sentence into a dependency tree. The dependency tree module 324 is further configured to, upon receiving the aspect term feature $H_\alpha$ from the attention module 322 and the context embedding $X_c$ from the embedding module 320, combine the dependency tree, the term feature and the context embedding into a dependency tree graph, and send the dependency tree graph to the GDT layers 326. Referring back to FIG. 2, the dependency tree graph has each word (and optionally one or more punctuations) of the sentence as one node of the graph, each node is characterized by the aspect term feature $H_\alpha$ or the context embedding $X_c$, and certain nodes are connected according to the parsed dependency tree. The dependency tree module 324 may include any parsing methods to parse the sentence into the dependency tree, such as Stanford CoreNLP, Berkeley Neural Parser, and Stanza Parser.

The GDT layers 326 is configured to, upon receiving the dependency tree graph from the dependency tree module 324, perform graph diffusion to update node embeddings in the dependency tree graph, such that the updated nodes are available to the classifier 328. The GDT layers 326 may include one or multiple GDT layers that have the same layer or block structure, but each layer or block has its specific parameters. Assume there is a total number of L GDT layers, where L is a positive integer, the disclosure defines the L GDT layers as layer 0, layer 1, . . . , layer l(or the l-th layer), . . . , layer (L−1), where l is from 0 to L−1. The input of layer 0 is the initial node embeddings of the dependency tree graph, that is, $H_\alpha$ and $X_c$. The combination of $H_\alpha$ and $X_C$ is the initial embedding $H^{(0)}$ for the layer 0. The output of layer 0 is $H^{(l)}$. Accordingly, the input and output for layer l are respectively $H^{(l)}$ and $H^{(l+1)}$. FIG. 3B schematically depicts one GDT layer 3260 according to certain embodiments of the present disclosure. As shown in FIG. 3B, the GDT layer 3260 includes a multi-head attention diffusion module 3261, a first layer normalization module 3262, a first addition module 3263, a second layer normalization module 3264, a feed forward module 3265, and a second addition module 3266.

At the start of a training of the sentiment classification application 318, the node embedding $H^{(0)}$ is available for both the multi-head attention diffusion module 3261 and the first layer normalization module 3262 of the first GDT layer 3260 (layer 0). After operation of the l-th GDT block, the outputted node embedding for that block, i.e., $H^{(l+1)}$, is available to both the multi-head attention diffusion module 3261 and the first layer normalization module 3262 of the next GDT layer. When the current GDT layer is the last GDT layer, the outputted node embedding is provided to the classifier 328.

The multi-head attention diffusion module 3261 is configured to, upon receiving the node embedding $H^{(l)}$, compute graph attention diffusion head$_i$ for each of T heads, concatenate the graph attention diffusions for all the heads to obtain concatenated attention diffusion $\hat{H}^{(l+1)}$ using the equation (11), and send the concatenated attention diffusion $\hat{H}^{(l+1)}$ to the first addition module 3263. The attention diffusion for head i is calculated by equation (12), which can be calculated from the equations (3), (4), (5), and (6) using the node embedding $H^{(l)}$ or approximated using equations (3), (4), (7), (8) and (9).

The first layer normalization module 3262 is configured to, upon receiving the inputted node embeddings $H^{(l)}$ at the l-th layer, perform layer normalization on the inputted node embeddings $H^{(l)}$ to obtain first normalized embedding Norm$(H^{(l)})$, and send the first normalized embedding Norm$(H^{(l)})$ to the first addition module 3263. In certain embodiments, the first layer normalization module 3262 may also perform its function before the operation of the multi-head attention diffusion module 3261.

The first addition module 3263 is configured to, upon receiving the concatenated attention diffusion $\hat{H}^{(l+1)}$ from the multi-head attention diffusion module 3261 and the first normalized embedding Norm$(H^{(l)})$ from the first layer normalization module 3262, add the concatenated attention diffusion $\hat{H}^{(l+1)}$ to the normalized embedding Norm$(H^{(l)})$ to obtain embedding with first addition $\tilde{H}^{l+1}$ (equation (13)), and send the embedding with the first addition $\tilde{H}^{l+1}$ to the second layer normalization module 3264 and the second addition module 3266.

The second layer normalization module 3264 is configured to, upon receiving the embedding with the first addition $\tilde{H}^{l+1}$, normalize the embedding to obtain second normalized embedding Norm$(\tilde{H}^{l+1})$, and send the second normalized embedding Norm$(\tilde{H}^{l+1})$ to the feed forward module 3265.

The feed forward module 3265 is configured to, upon receiving the second normalized embedding Norm$(\tilde{H}^{l+1})$, perform feed forward to obtain feed forward embedding $W_2$ $(\sigma(W_1 \text{Norm}(\tilde{H}^{l+1})))$, and send the feed forward embedding to the second addition module 3226.

The second addition module 3266 is configured to, upon receiving the embedding with the first addition $\tilde{H}^{l+1}$ from the first addition module 3263 and the feed forward embedding $W_2$ $(\sigma(W_1 \text{Norm}(\tilde{H}^{l+1})))$ from the feed forward module 3265, perform an addition of the two to obtain the updated node embedding $H^{(l+1)}$ by equation (14), such that the updated node embedding $H^{(l+1)}$ is available to the next GDT layer, or available to the classifier 328 when the current layer is the last GDT layer. Kindly note the operations of the second layer normalization module 3264m the feed forward module 3265 and the second addition module 3266 are preferably performed together according to the equation (14).

The classifier 328 is configured to, upon receiving the updated node embedding $H^{(l+1)}$ from the second addition module 3266 of the last GDT layer (here the last GDT layer is layer l), extract term node feature $\hat{H}_t$ from the updated node embedding $H^{(l+1)}$, feed the term node feature $\hat{H}_t$ to a two-layer MLP to calculate the final classification score $\hat{y}$ of the term node using the equation (15), calculate a loss function using the equation (16), and adjust model parameters based on the loss function. The model parameters include parameters for the embedding module 320, the attention module 322, the GDT layers 326, and the classifier 328. During prediction, the classification score f is used to give the prediction of the sentiment classification of the aspect term, and there is no need to calculate the loss function and adjust parameters. In certain embodiments, the opinions 334 for training and prediction may be different but related datasets. For example, the training opinions may be customer comments with labeled aspect terms, while the opinions for prediction may be customer comments with aspect terms, but the aspect terms are not labeled with sentiment classification.

The function module 330 is configured to, when the classification of an aspect term is determined for an aspect term-sentence pair, add the classification label of the aspect term to the aspect term-sentence pair. When a large number of aspect term-pairs are labeled, the function module 330 is further configured to present the labeled opinions to the customers. The classification, for example, can be "positive," "negative," or "neutral." In certain embodiments, the function module 330 may perform function of presentation to the customers by recommending a product to the customer when an aspect term of an opinion about a product is positive, and the customer is searching product using the aspect term. In an example, opinions or comments from customers on products are available, and aspect terms of the products are predefined. The predefined terms may by rule-based. For example, "quality" and "price" may be defined as a rule, and the application may find the "quality" and "price" terms in an opinion and define them as aspect terms of the opinion. After receiving the opinions with labeled aspect terms, the sentiment classification application 318 is configured to classify the aspect terms into positive, negative, or neutral, and present the results to customers. When an opinion on a product include two aspect terms, one aspect term such as "quality" may be positive (high quality), and the other aspect term "price" may be negative (expensive). When a new customer review the opinion and she cares more about the "quality" aspect, she may choose to buy the product because the classification of the "quality" is positive; if she cares more about the "price" aspect, she may choose not to buy the product because the classification of the "price" is negative. By providing the opinions based on their aspect terms, the sentiment classification application 318 provides a fine-grained result for the customers to make decisions.

In certain embodiments, the function module 328 is configured to perform the above function automatically or in a predefined time interval, or when trigged by an update of the opinions 334. For example, after the update of the opinions 334, the function module 328 would look for more linked relations between products and customers, and the function module 328 would subsequently push the products to the corresponding customers when the updated relations between the customers and the products are interested in.

The interface 330 is configured to provide an interface for an administrator of the sentiment classification application 318 to train the embedding module 320, the attention module 322, the GDT layers 326, the classifier 328, and optionally the dependency tree module 324 and the function module 330, and adjust model parameters, or is configured to provide a user interface for the administrator to use the sentiment classification application 318 to obtain and use the opinions 334 for certain functions.

FIG. 4 schematically depicts a training process for sentiment classification application according to certain embodiments of the present disclosure. In certain embodiments, the training process is implemented by the computing device 310 shown in FIG. 3A. It should be particularly noted that, unless otherwise stated in the present disclosure, the steps of the training process or method may be arranged in a different sequential order, and are thus not limited to the sequential order as shown in FIG. 4.

As shown in FIG. 4, at procedure 402, an aspect term-sentence pair is provided, the embedding module 320 embeds the aspect term to aspect term embeddings, and sends the aspect term embeddings to the attention module 322.

At procedure 404, the attention module 322 processes the aspect term embeddings to obtain term feature, and sends the term feature to the dependency tree module 324. The aspect term embeddings may include embeddings of one or multiple tokens, while the obtained term feature is one embedding has the dimension of $d_B$.

At procedure 406, the embedding module 320 embeds the sentence without the aspect term to obtain context embeddings, and sends the context embeddings to the dependency tree module 324. When a context word has multiple embedding tokens, the embedding tokens are averaged, such that each embedding in the obtained context embeddings corresponds to one word in the sentence context. In certain embodiments, punctuation in the sentence also has a corresponding embedding. In certain embodiments, the procedures 402 and 406 are performed together, for example, using the input "[CLS]+Sentence+[SEP]+Term+[SEP]."

At procedure 408, the dependency tree module 324 parses the sentence to obtain dependency tree of the sentence, each word and optionally the punctuation is a unit or a node in the dependency tree. Kindly note that the procedures 402-404, the procedure 406, and the procedure 408 may be performed in parallel.

At procedure 410, the dependency tree module 324, upon parsing the sentence and upon receiving the term feature and the context embedding, forms a dependency tree graph. The feature of each node in the dependency tree graph is either the aspect feature corresponding to the aspect term, or embedding of one word in the context of the sentence, or optionally an embedding of a punctuation of the sentence. When two words are linked in the dependency tree, the dependency tree graph will define it as an edge. In other words, the dependency tree provides the tree structure, and the term feature and context embeddings provide characters or features of the nodes. After obtaining the dependency tree graph, the dependency tree module 324 sends the dependency tree graph to the first GDT layer of the GDT layer 326.

At procedure 412, the GDT layers 326 processes the dependency tree graph in sequence. For each of the GDT layer 3260, for example layer l, the GDT layer performs multi-head attention to update the node embeddings. With the input $H^l$ (which is $H^0$ for the first GDT layer), the multi-head attention diffusion module 3261 calculates one-hop attention score $s_{i,j}^{(l)}$ between the node i and the node j using the equation $$s_{i,j}^{(l)} = \sigma_2(v * \sigma_1(W_h h_i^{(l)} \| W_t h_j^{(l)})), \qquad (3)$$

where $h_i^{(l)}$ and $h_j^{(l)}$ denote the feature or embeddings of node i and j at the layer l, respectively. The $h_i^{(l)}$ and $h_j^{(l)}$ come from the node embeddings $H^l$. The multi-head attention diffusion module 3261 calculates one-hop attention score between all the nodes, and obtains the one-hop attention matrix $S^{(l)}$ as:

$$S^{(l)} = \begin{cases} s_{i,j}^{(l)}, & \text{if there is an edge between } i \text{ and } j \\ -\infty, & \text{otherwise} \end{cases}.$$

At procedure 414, the multi-head attention diffusion module 3261 performs softmax on the one-hop attention score matrix $S^{(l)}$ to obtain the one-hop attention matrix $A^{(l)}$ by: $A^{(l)} = \text{softmax}(S^{(l)})$ (4).

At procedure 416, the multi-head attention diffusion module 3261 calculates multi-head attention matrix (also named diffusion attention matrix) $\tilde{A}^{(l)}$ based on the one-hop attention matrix $A^{(l)}$ by: $\tilde{A}^{(l)} = \sum_{i=0}^{\infty} \alpha(1-\alpha)^i A^{i(l)}$, $\alpha \in (0, 1]$ (5), where a is the attention decay factor. $A^{i(l)}$ is the i-th power of $A^{(l)}$, and represents i-hop attention matrix.

At procedure 418, the multi-head attention diffusion module 3261 calculates graph attention diffusion $\overline{H^{(l+1)}}$ by: $\overline{H^{(l+1)}} = \tilde{A}^{(l)} H^l$ (6).

In certain embodiments, to increase the calculation speed, the graph attention diffusion $\overline{H^{(l+1)}}$ is approximately calculated by:

$$Z^{(k+1)} = (1-\alpha)A^{(l)}Z^k + \alpha H^l \quad (7),$$

$$Z^{(0)} = H^l \quad (8), \text{ and}$$

$$\overline{H^{(l+1)}} = Z^k \quad (9).$$

In other words, the calculation by the equations (7), (8) and (9) can be used to replace the procedures 416 and 418, or to replace the calculations of the equations (5) and (6). As described above, α is a predefined constant in a range of 0-0.5, preferably in a range of 0.05 to 0.25, and could be for example 0.1 or 0.15. $0 \le k \le K$, and K is the hop number. K is a positive integer in a range of 3-10. Because $Z^{(k)}$ can be calculated recursively, the calculation is much faster than the calculation using the equations (5) and (6).

At procedure 420, the procedures 412-418 are performed for each head, and the graph attention diffusion for each head are concatenated to obtain the concatenated graph attention diffusions by: $\hat{H}^{(l+1)} = \text{Concat}(h_1^{(l+1)}, \ldots, h_T^{(l+1)})W^0$ (11). The $h_i^{(l+1)}$ in equation (11) is defined as: $h_i^{(l+1)} += \text{Attn\_Diffusion}(h_i^{(l)}, \mathcal{G})$ (12). After obtaining the concatenated graph attention diffusion $\hat{H}^{(l+1)}$, the multi-head attention diffusion module 3261 further sends the concatenated graph attention diffusion to the first addition module 3263.

At procedure 422, the first layer normalization module 3262 performs layer normalization on the input node embedding $H^l$ to obtain normalized embedding $\text{Norm}H^l$, and sends the normalized embedding to the first addition module 3263.

At procedure 424, upon receiving the concatenated graph attention diffusion from the multi-head attention diffusion module 3261 and the normalized embedding $\text{Norm}(H^{(l)})$ from the first layer normalization module 3262, the first addition module 3263 adds the concatenated graph attention diffusion $\hat{H}^{(l+1)}$ to the normalized embedding of the previous GDT layer $H^{(l)}$ or from the normalized initial embedding $H^0$ (if the current GDT layer is the first GDT layer) to obtain added attention diffusion $\tilde{H}^{l+1}$ by: $\tilde{H}^{l+1} = \hat{H}^{l+1} + \text{Norm}(H^{(l)})$ (13).

At procedure 426, upon receiving the added attention diffusion, the second layer normalization module 3264 performs layer normalization on the added graph attention diffusion to obtain normalized attention diffusion: Norm $(\tilde{H}^{l+1})$, and sends the normalized attention diffusion to the feed forward module 3265.

At procedure 428, upon receiving the normalized attention diffusion from the second layer normalization module 3264, the feed forward module 3265 performs feed forward on the normalized attention diffusion to obtain the feed forward attention, and sends the feed forward attention to the second addition module 3266. The feed forward attention is $W_2(\sigma(W_1 \text{Norm}(\tilde{H}^{l+1})))$.

At procedure 430, upon receiving the feed forward attention from the feed forward module 3265, the second addition module 3266 adds the added attention diffusion to the feed forward attention, to obtain the updated embedding $H^{(l+1)}$ that is: $H^{(l+1)} = W_2 (\sigma(W_1 \text{Norm}(\tilde{H}^{l+1}))) + \tilde{H}^{l+1}$ (14). After obtaining the updated embedding $H^{(l+1)}$, the second addition module 3266 sends the updated embedding to the next GDT layer. In certain embodiments, the feed forward attention has a two-layer MLP network. When the layer l is the last GDT layer (or the last GDT block), then the final output of the GDT layers 326 is embedding $H^{(l+1)}$.

At procedure 432, upon receiving the output embedding $H^{(l+1)}$ from the last GDT layer 3260, the classifier 328 calculates a classification score for the aspect term embedding by: $\hat{y} = W_2 \sigma(W_1 \hat{H}_t^T)$ (15), where $\hat{H}_t$ is the embedding of the aspect term that can be extracted from the node embedding matrix $H^{(l+1)}$.

At procedure 434, the classifier further calculates a loss function based on the classification score and the ground true label of the aspect term by loss $= -\sum_{c=1}^{C} y \log \hat{y} + \lambda \|\theta\|^2$ (16), and adjusts parameters of the sentiment classification application 318 based on the loss.

The whole training process may be performed iteratively using multiple training aspect term-sentence pairs, until the training is repeated for a predetermined number of times, or until the model parameters converge. Each aspect term-sentence pair may be used once or multiple times in the training.

Figure 5:
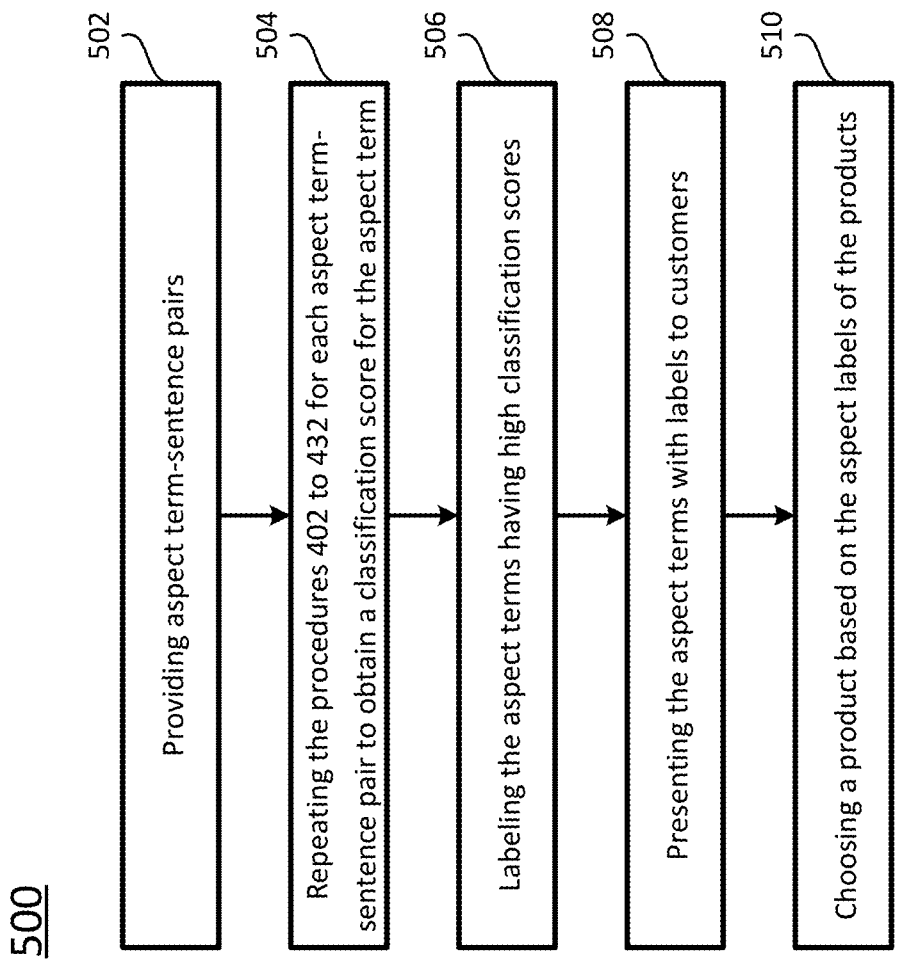
FIG. 5 schematically depicts a method for aspect level sentiment classification according to certain embodiments of the present disclosure.

FIG. 5 schematically depicts method 500 for aspect-term classification according to certain embodiments of the present disclosure, after the sentiment classification application 318 is well-trained. In certain embodiments, the method is implemented by the computing device 310 shown in FIG. 3A, specifically the function module 330. It should be particularly noted that, unless otherwise stated in the present disclosure, the steps of the prediction process or method may be arranged in a different sequential order, and are thus not limited to the sequential order as shown in FIG. 5. Kindly note that the training data of the Sentiment classification application 318 may be the same knowledge graph 332.

As shown in FIG. 5, at procedure 502, the function module 330 provides aspect term-sentence pairs. The sentences in the term-sentence pairs may be customer comments on an ecommerce platform, and the aspect terms may be extracted from the customer comments using a rule, such as defining price and quality of the products as the aspect terms.

At procedure 504, for each aspect term-sentence pair, the function module 330 calls the embedding module 320, the attention module 322, the dependency tree module 324, the GDT layers 326, and the classifier 328 to perform the procedures 402-432, so as to obtain the classification score of the aspect term in the corresponding sentence. There are a large number of aspect term-sentence pairs, and there are a large number of corresponding classification scores.

At procedure 506, the function module 330 ranks the classification scores, and labels the aspect terms that have the high classification scores. For example, the function module 330 may label the aspect terms whose classification scores are at a predetermined percentage of the rank, such as top 10% of the rank, or top 20% of the rank. In another example, the function module 330 may set a threshold classification score, and when an aspect term has a classification score that is greater than the threshold classification score, the classification is regarded as true and the function module 330 labels the aspect term with its predicted classification.

At procedure 508, the function module 330 adds the aspect term labels, the sentences, and the related products as a knowledge graph or database, and presents the knowledge graph or database to the customers.

At procedure 510, when the customers search or review the products, he can choose the product based on the product's aspect term labels, and the function module 330 may be, upon receiving an instruction from a customer that she is interested, help the customer to place an order of the product.

EXPERIMENTS

Data Sets.

We evaluate our model on three datasets: Restaurant and Laptop reviews from SemEval 2014 Task 4 and ACL 14 Twitter dataset. We remove several examples with "conflict" labels in the reviews. The statistics of these datasets are listed in FIG. 6, Table 1. We obtain dependency trees using the Stanford CoreNLP (Manning et al., The Stanford CoreNLP natural language processing toolkit, Proceedings of 52nd annual meeting of the association for computational linguistics: system demonstrations, 2014, 55-60) for our experiments.

Baselines. We compare our model with following baseline models:
1. BERT-SPC (Song et al., Attentional encoder network for targeted sentiment classification, arXiv: 1902.09314, 2019, which is incorporated herein by reference in its entirety) feeds the sentence and term pair into the BERT model and the BERT outputs are used for prediction.
2. AEN-BERT (Song et al., 2019 as above) uses BERT as the encoder and employs several attention layers.
3. TD-GAT-BERT (Huang and Carley, Syntax-aware aspect level sentiment classification with graph attention networks, Proceedings of the 2019 Conference on Empirical Methods in Natural Language Processing and the 9th International Joint Conference on Natural Language Processing (EMNLP-IJCNLP), 2019, 5472-5480) utilizes GAT on the dependency tree to propagate features from the syntactic context.
4. R-GAT+BERT (Want et al., Relational graph attention network for aspect-based sentiment analysis, arXiv: 2004.12362, 2020) reshapes and prunes the dependency parsing tree to an aspect-oriented tree rooted at the aspect term, and then employs Relational GAT to encode the new tree for sentiment predictions.

We only choose strong baselines with BERT model as the encoder for fair comparison. Rietzler et al. (Adapt or get left behind: Domain adaptation through BERT language model finetuning for aspect-target sentiment, 2019) works on the same task with millions of extra data thus it's not comparable with our model. Zhang et al. (Aspect-based sentiment classification with aspect specific graph convolutional networks, EMNLP-IJCNLP, 2019, 4560-4570) and Sun et al. (Aspect-level sentiment analysis via convolution over dependency tree, EMNLP-IJCNLP, 2019, 5683-5692) both employ GNN over dependency trees to learn the syntax-aware representation of the aspect term, but they didn't use BERT as the encoder. Therefore, we implement our own GCN/GAT over dependency trees models based on BERT encoder as our baselines.

We implement our own BERT-Single by directly applying a classifier on top of BERT-base encoder. BERT+GAT and BERT+GCN employs GAT and GCN respectively on dependency trees based on the BERT-base encoder. The best results of the GAT and GCN models come from two or three layers, depending on different datasets. The implementations of GAT and GCN come from Deep Graph Library (DGL) (Want et al., Deep graph library: Towards efficient and scalable deep learning on graphs, 2019). BERT+GDT is our proposed GDT model with the BERT-base model as the encoder. Roberta+GDT replaces the encoder with the Roberta base model.

Parameter Setting. During training, we set the learning rate to $10^{-5}$. We set the batch size to 4. The dimension of BERT output $d_B$ is 1536 (we take the concatenation of last two layers outputs from BERT). The dimension of the GDT model on dependency trees d is 256 or 512 according to different datasets. We use 4 or 8 heads during multi-head attention. We apply dropout (Srivastava, et al., Dropout: a simple way to prevent neural networks from overfitting, The Journal of Machine Learning Research, 2014, 15(1):1929-1958) and L2 regularization. The coefficient rate $\lambda$ of L2 is $10^{-6}$.

Experimental Results.

We present results of our GDT model in two aspects: classification performance and qualitative case study.

Classification. FIG. 7, Table 2 shows comparisons of the GDT model with other baselines in terms of classification accuracy and Macro-F1. From this table, we observe that: the GDT model achieves the best results on "Restaurant" and "Laptop" datasets and shows competitive results on the "Twitter" dataset as well. Applying Roberta-base model as the encoder in our model further boosts the performance on three datasets.

Specifically, both BERT+GCN and BERT+GAT outperform BERT-Single, which proves the benefit of using syntactic dependency tree information. BERT+GCN is worse than BERT+GAT, which shows that attentively aggregating information learns better node representations than treating each node equally.

The performance gain of the GDT model over the GAT model on Twitter domain is not as significant as Restaurant and Laptop domains. After checking into the data, the reason may be that the sentences in Twitter dataset are more colloquial and lack of grammatical norms, which is more likely to cause dependency parsing errors. This also explains the performance drop of BERT+GCN and BERT+GAT, compared to BERT-Single. Although our GDT model also operates on dependency parsing trees, it sees more context than GAT in single layer, thus more robust to parsing errors.

Figure 8A:
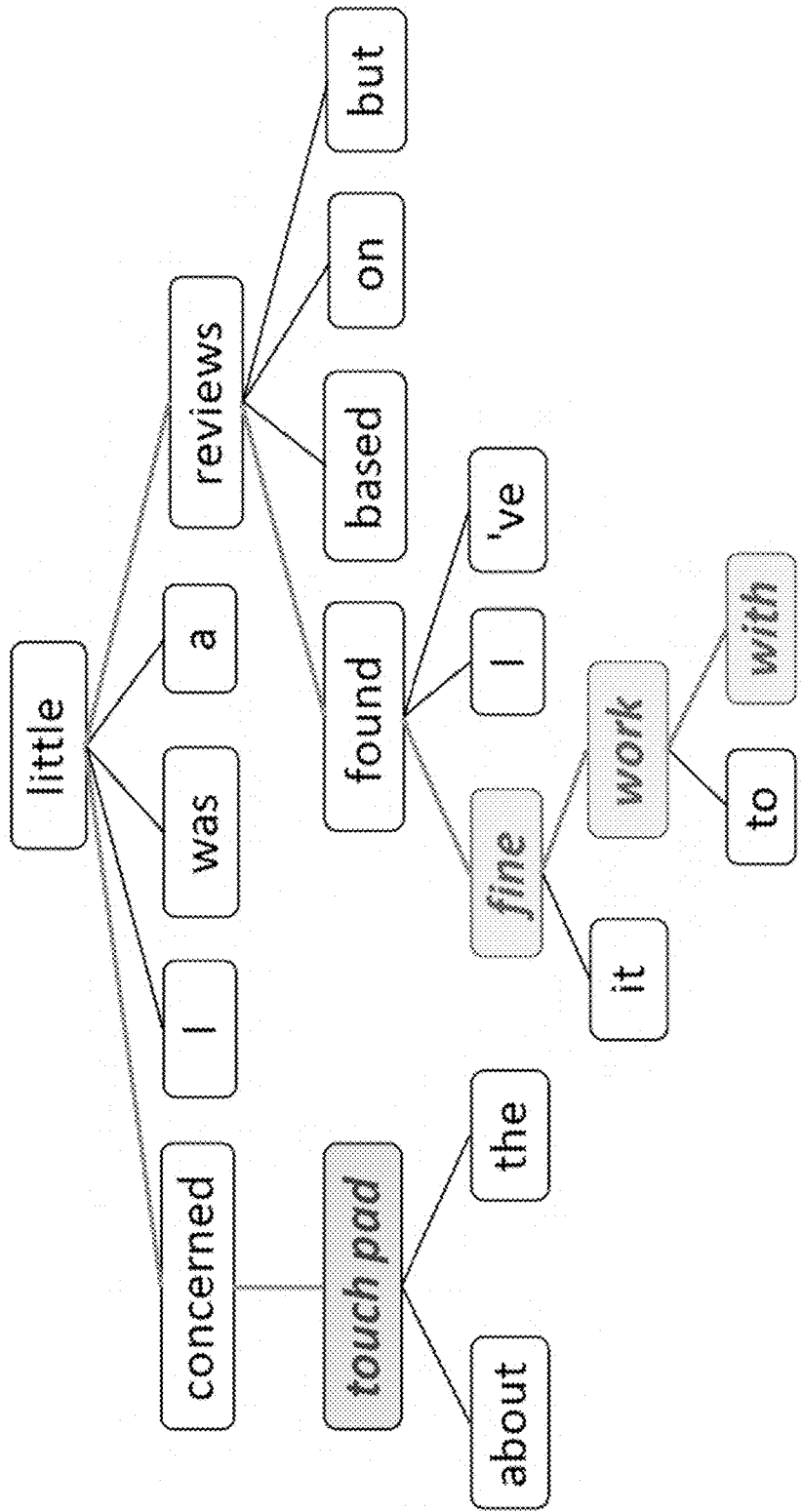
FIG. 8A schematically depicts an aspect term-opinion pair, where the aspect term can be correctly predicted by the sentiment classification application according to certain embodiments of the present disclosure.
Figure 8B:
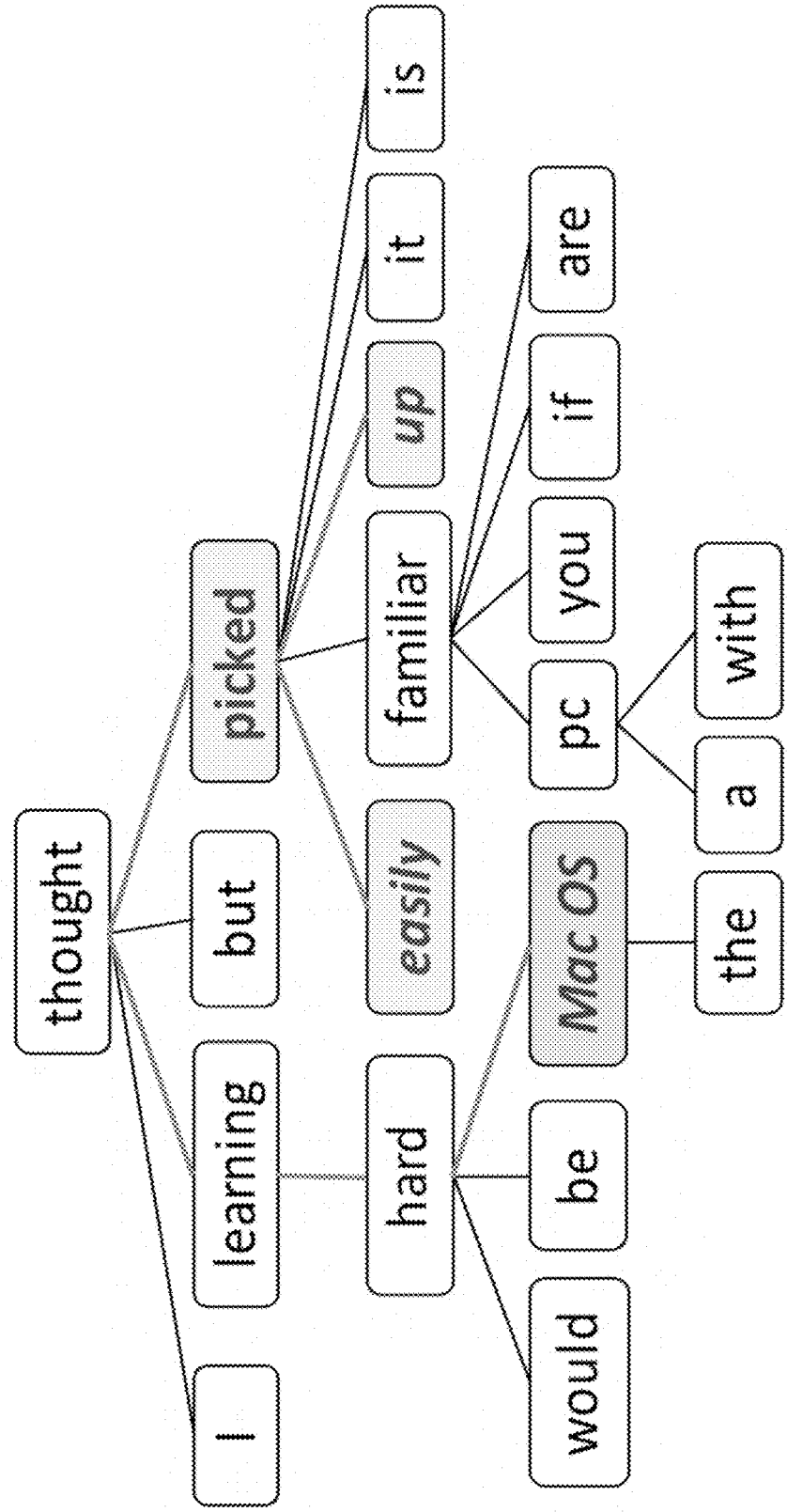
FIG. 8B schematically depicts another aspect term-opinion pair, where the aspect term can be correctly predicted by the sentiment classification application according to certain embodiments of the present disclosure.

Qualitative case Study. The long distance between the aspect word and opinion context could be caused by parsing errors or original complex dependency structures of sentences. To show the efficacy of the GDT model on dealing with this problem, we demonstrate three examples. Specifically, FIG. 1 and FIG. 8A show long-hop examples due to parsing errors. FIG. 8B is a long-hop example caused by its inherent complex dependency structure. Aspect terms are "touch pad" in FIG. 8A and "Mac OS" in FIG. 8B, and the aspect terms are italic in the figures. These sentences are predicted correctly by the GDT model but wrongly by BERT+GAT.

The parsing error in FIG. 1 results in four hops between the aspect term "soup" and the opinion context "not tasty."

In the FIG. 8A example, there are six hops between the term "touch pad" and the opinion context "fine to work." The FIG. 8B example has complex syntactic structure leading to a five-hop distance between "Mac OS" and "easily picked up." All three examples are predicted wrong by the GAT model, because the shallow GAT model cannot learn the interactions between nodes so far away from each other. However, the GDT model could effectively aggregate information from these important opinion context in one layer and make the right prediction.

Figure 8C:
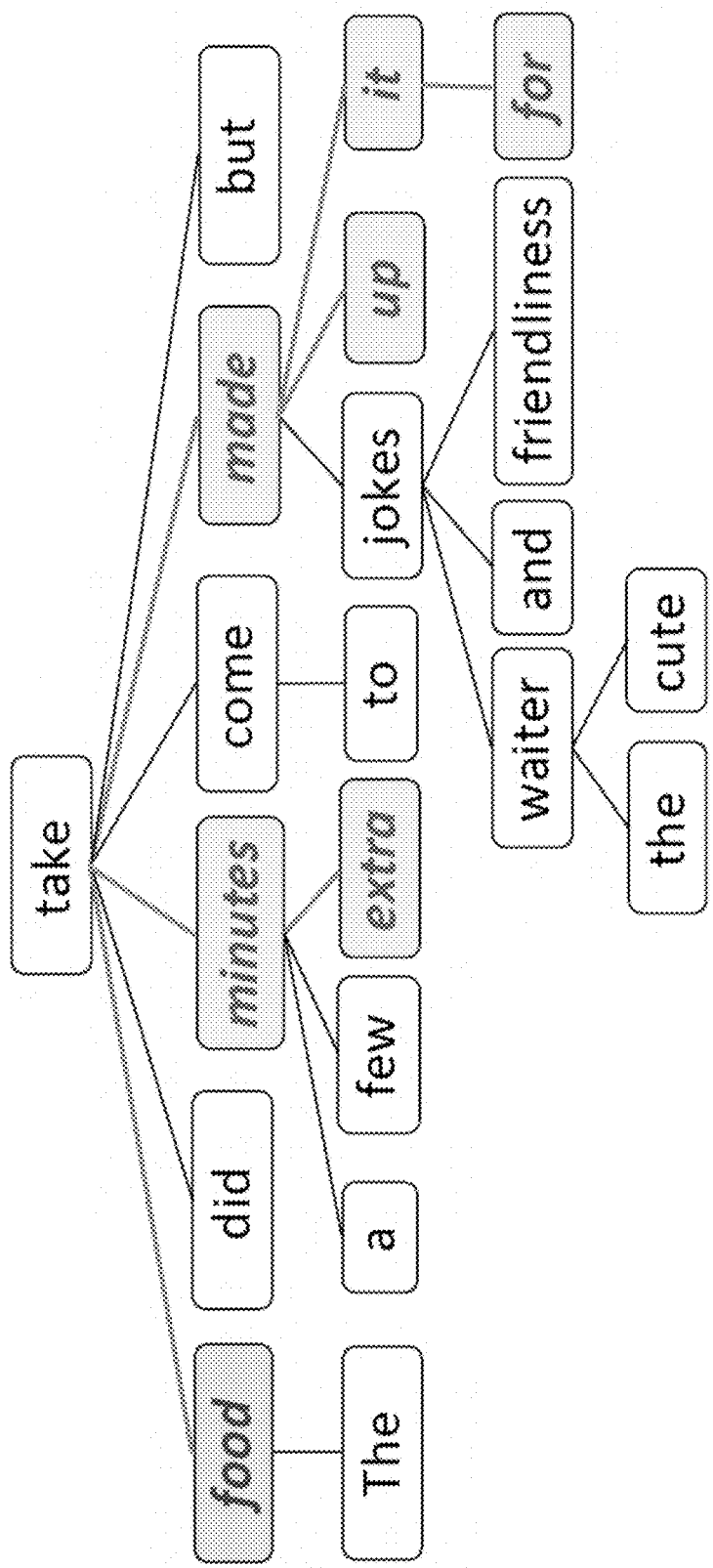
FIG. 8C schematically depicts a further aspect term-opinion pair, where the aspect term can be correctly predicted by the sentiment classification application according to certain embodiments of the present disclosure.

In addition, we also found that GDT shows better performance when dealing with examples that require global understanding of the whole sentence. FIG. 8C demonstrates a specific example. The sentiment label of the term "food" is neutral. In order to predict it correctly, the model needs to access the two phrases, "extra minutes" and "made up for it," and then fuse the information from them. The GAT model classifies the sentiment as negative and the GDT model correctly predicts it as neutral. The reason is that, compared with the GAT model, our GDT model could make the aspect term see the two important context phrases in a single layer and effectively integrate their messages.

Model Analysis

We further analyzed our GDT model from two perspectives: number of layers analysis and attention distribution analysis.

Figure 9:
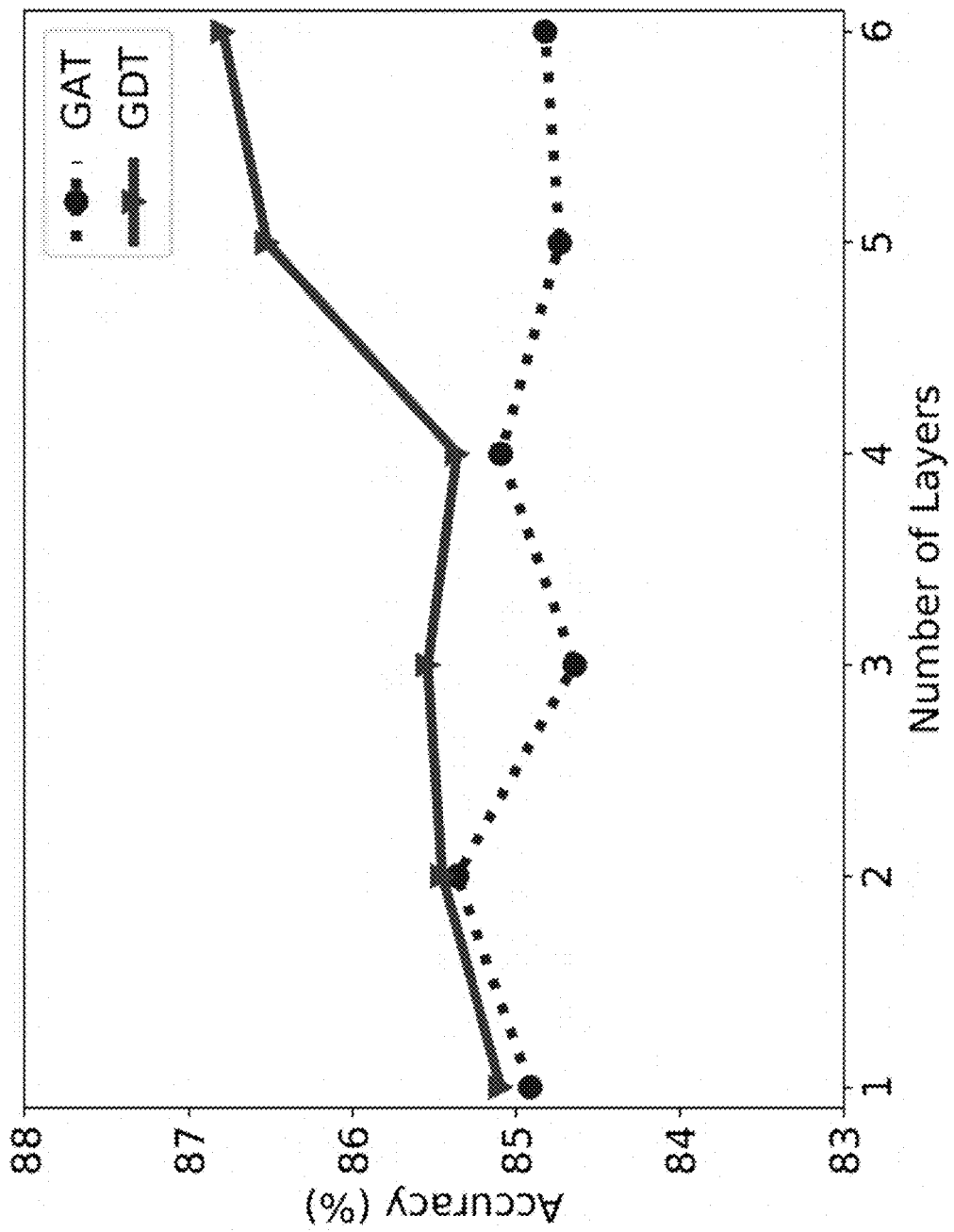
FIG. 9 schematically depicts impact of number of layers on Restaurant dataset by GAT and GDT.

Number of Layers Analysis. We explore the effect of the layer number on our model and GAT respectively. We vary the layer number from one to six and measure the corresponding accuracy on "Restaurant" dataset. The result is illustrated in FIG. 9. Similar results are found on "Laptop" and "Twitter" dataset. From FIG. 9, we can see that the GAT model achieves the best performance at two layers and then the overall accuracy goes down as the layer increases. The GDT model shows better performance with deeper layers and obtains the best result at six layers. This comparison shows that the GDT model is more robust to the increase of layers and could alleviate the over-smoothing problem to a certain extent. Besides, in each layer, the GDT model performs better than the GAT model, which further indicates that aggregating information from more context in one layer is more helpful to this task.

Attention Distribution Analysis. We also study the attention weights distributions of the GAT and GDT models. In this aspect-level sentiment classification task, in order to do the correct prediction, it's essential for an aspect term to locate the right opinion context. If the learnt attention weights distribution is close to uniform distribution, i.e., each node treats its neighbors with almost equal weights, then it's hard for the node to differentiate the truly important context words. Therefore, for the GAT and GDT model, we respectively measure its attention weights distribution difference to the uniform distribution on the "Restaurant" dataset. We use a discrepancy metric proposed in Shanthamallu, A regularized attention mechanism for graph attention networks, 2020 IEEE International Conference on Acoustics, Speech and Signal Processing (ICASSP), 2020, 3372-3376, to calculate the difference:

$$d_i = \frac{\|A_{i,:} - U_i\|}{\text{degree}(v_i)}, \quad (17)$$

where $A_{i,:}$ represents the importance of each node in approximating the feature for node $v_i$, $U_i$ is the uniform distribution score for node $v_i$. $d_i$ measures the non-uniformity in the learned attention weights, the lower discrepancy value is, the stronger the uniformity of the learnt attention weight is.

Figure 10:
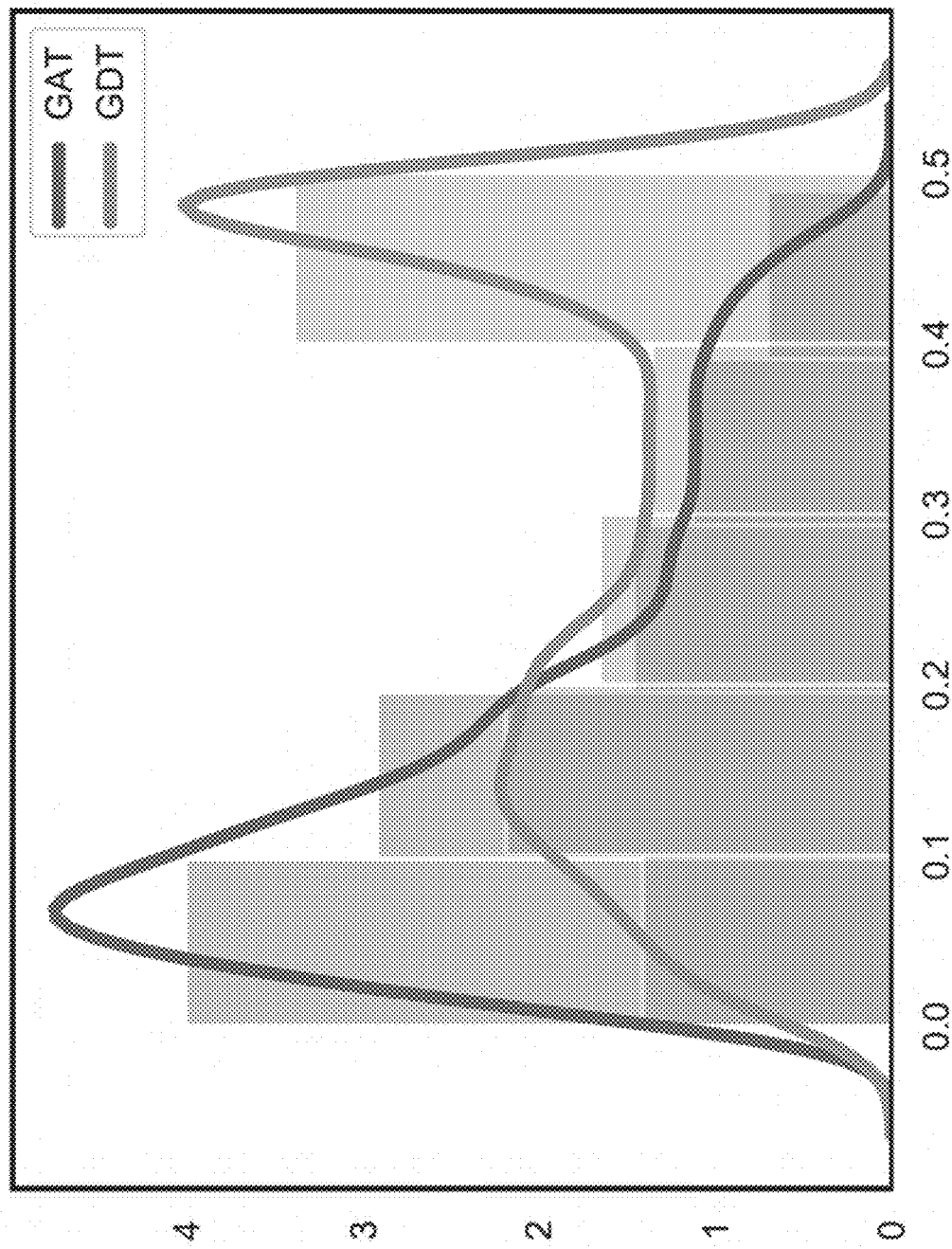
FIG. 10 schematically depicts attention distribution of GAT and GDT.

The result is illustrated in FIG. 10. For fair comparison, we select the attention weights from the first layer's outputs in both models. We can see that the GAT model has more edges with attention weights difference close to zero, meaning that the GAT model learns more uniformly distributed attention weights compared to the GDT model. The result validates the statement that the GDT model is more capable to discriminate valuable context words and make better predictions.

In summary, the present disclosure provides a GDT model for the aspect-level sentiment classification task. We first encode the aspect term and context words by pre-trained BERT to capture the interaction between them. Then in order to handle the situations where the aspect terms are far away from opinion context, we design a GDT model on top of dependency trees to integrate multi-hop neighbor's information according to the dependency structure in one layer. Our extensive experiments show that our model achieves the new state-of-the-art results on the SemEval datasets and shows comparable results on the ACL 14 Twitter dataset.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system comprising a computing device, the computing device comprising a processor and a storage device storing computer executable code, wherein the computer executable code comprises a plurality of graph diffusion transformer (GDT) layers, and wherein the computer executable code, when executed at the processor, is configured to:

receive a sentence having an aspect term and context, the aspect term having a classification label;

convert the sentence into a dependency tree graph;

calculate, by using an l-th GDT layer of the plurality of GDT layers, an attention matrix of the dependency tree graph based on one-hop attention between any two of a plurality of nodes in the dependency tree graph;

calculate graph attention diffusion from multi-hop attention between any two of the plurality of nodes in the dependency tree graph based on the attention matrix;

obtain an embedding of the dependency tree graph using the graph diffusion attention;

classify the aspect term based on the embedding of the dependency tree graph to obtain predicted classification of the aspect term;

calculate a loss function based on the predicted classification of the aspect term and the classification label of the aspect term; and adjust parameters of models in the computer executable code based on the loss function, wherein the l-th GDT layer of the plurality of GDT layers is configured to calculate the attention matrix by:

calculating an attention score $s_{i,j}^{(l)}=\sigma_2\ (v^*\sigma_1(W_h h_i^{(l)} \| W_t h_j^{(l)}))$ for nodes i and node j in the dependency tree graph, wherein $W_h$, $W_t \in \mathbb{R}^{d \times d}$ and $v \in \mathbb{R}^{2 \times d}$ are learnable weights, $h_i^{(l)}$ is a feature of node i at the l-th GDT layer, d is a hidden dimension of $h_i^{(l)}$, $\|$ is a concatenation operation, $\sigma_1$ is a ReLU activation function, and $\sigma_2$ is a LeakyReLU activation function;

obtaining attention score matrix $S^{(l)}$ by:

$$S^{(l)} = \begin{cases} s_{i,j}^{(l)}, & \text{if there is an edge between } i \text{ and } j \\ -\infty, & \text{otherwise} \end{cases};$$

and calculating the attention matrix $A^{(l)}$ by: $A^{(l)}=\text{softmax}(S^{(l)})$.

2. The system of claim 1, wherein the computer executable code comprises an embedding module, an attention module, and a dependency tree module, and the embedding module, the attention module and the dependency tree module are configured to convert the sentence into the dependency tree graph by:

embedding, by the embedding module, the aspect term to obtain an aspect term embedding $X_t$;

converting, by the attention module, the aspect term embedding to aspect term feature $\alpha=\text{softmax}(\sigma(W_2 \sigma(W_1 X_t^T)))$ and $H_\alpha = \alpha X_t$, wherein $\alpha \in \mathbb{R}^{1 \times m}$, $H_\alpha \in \mathbb{R}^{1 \times d}$, m is a positive integer indicating a number of embedding tokens of the aspect term, d is a positive integer indicating dimensions of aspect term embedding, $X_t^T$ is the transposition of $X_t$, and $\sigma$ denotes tanh activation function, $W_1$ and $W_2$ are matrices pertaining to learnable weights;

embedding, by the embedding module, the context to obtain context embeddings $X_c$, each of the context embeddings corresponding to a word or a punctuation in the sentence that are not the aspect term;

parsing, by the dependency tree module, the sentence into a dependency tree; and combining, by the dependency tree module, the aspect term feature $H_\alpha$, the context embeddings $X_c$, and the dependency tree into the dependency tree graph, wherein each node of the dependency tree graph has a feature corresponding to one of the aspect term embedding and the context embeddings.

3. The system of claim 1, wherein the l-th GDT layer is configured to calculate the graph attention diffusion attention by:

calculating diffusion attention matrix $\tilde{A}^{(l)}$ by: $\tilde{A}^{(l)} = \Sigma_{hop=0}^{\infty} \alpha(1-\alpha)^{hop} A^{hop(l)}$ $\alpha \in (0, 1]$, wherein hop is a positive integer in a range of 2-12, and $\alpha$ is an attention decay factor; and calculating the graph attention diffusion $\overline{H^{(l+1)}}$ by: $\overline{H^{(l+1)}} = \tilde{A}^{(l)} H^{(l)}$, wherein $H^{(l)}$ is input dependency tree graph embedding of the l-th GDT layer.

4. The system of claim 3, wherein the l-th GDT layer is configured to approximate the graph attention diffusion $\overline{H^{(l+1)}}$ by:

$Z^{(k+1)}=(1-\alpha)A^{(l)}Z^k+\alpha H^{(l)}$;

$Z^{(0)}=H^{(l)}$; and $\overline{H^{(l+1)}}=Z^k$, wherein k is an integer in a range of [0–K].

5. The system of claim 4, wherein K is a positive integer in a range of 2-12, and l is a positive integer in a range of 2-24.

6. The system of claim 5, wherein the l-th GDT layer is configured to obtain the embedding of the dependency tree graph by:

concatenating the graph attention diffusions $\overline{H^{(l+1)}}$ of a plurality of heads to obtain concatenated attention diffusion $\hat{H}^{(l+1)}$ by: $\hat{H}^{(l+1)}=\text{Concat}(h_1^{(l+1)}, \ldots, h_T^{(l+1)}) W^O$, wherein each of $h_1^{(l+1)}, \ldots, h_T^{(l+1)}$ corresponds to one of the plurality of graph attention diffusions $\overline{H^{(l+1)}}$, $W^O = \mathbb{R}^{Td_h \times Td_h}$, T is a number of heads, $d_h$ is hidden dimensions of each head, and $d_h=d/T$;

performing $\tilde{H}^{l+1}=\hat{H}^{(l+1)}+\text{Norm}(H^{(l)})$; and performing $H^{(l+1)}=W_2\ (\sigma(W_1 \text{Norm}(\tilde{H}^{(l+1)})))+\hat{H}^{(l+1)}$, wherein $W_1 \in \mathbb{R}^{d \times d}$ and $W_2 \in \mathbb{R}^{d \times d}$ are trainable matrix, $\sigma$ represents ReLU activation function, and $H^{(l+1)}$ is the embedding of the dependency tree graph.

7. The system of claim 6, wherein the computer executable code comprises a classifier, and the classifier is configured to classify the aspect term by:

$\hat{y}=W_2\sigma(W_1\hat{H}_t^T)$, wherein $W_2 \in \mathbb{R}^{C \times d_{out}}$ and $W_1 \in \mathbb{R}^{d_{out} \times d_h}$ are learnable weight matrices, C is class number of the classification, $\sigma$ is tanh activation function, $\hat{H}_t$ is aspect term embedding extracted from the embedding $H^{(l+1)}$, $\hat{H}_t^T$ is transpose of $\hat{H}_t$, and $d_{out}$ is dimensions of $H^{(l+1)}$.

8. The system of claim 7, wherein the classifier is configured to calculate the loss function by:

$\text{loss}=-\Sigma_{c=1}^{C} y \log \hat{y}+\lambda\|\theta\|^2$, wherein $\lambda$ is a coefficient for L2-regularization, $\theta$ are parameters that need to be regularized, and y is the label of the aspect term.

9. The system of claim 8, wherein the computer executable code is further configured to:

receive a query sentence and a query aspect term from the query sentence;

convert the query sentence into a query dependency tree graph;

calculate a query attention matrix of the query dependency tree graph based on one-hop attention between any two of a plurality of the nodes in the query dependency tree graph;

calculate a query graph attention diffusion from the query attention matrix;

obtain a query embedding of the query dependency tree graph using the query graph attention diffusion;

classify the query aspect term based on the query embedding of the query dependency tree graph to obtain predicted classification of the query aspect term; and label the query aspect term with the predicted classification.

10. A method comprising:

receiving, by a computing device, a sentence having an aspect term and context, the aspect term having a classification label, wherein the computing device comprises a processor and a storage device storing computer executable code, and wherein the computer executable code comprises a plurality of graph diffusion transformer (GDT) layers;

converting, by the computing device, the sentence into a dependency tree graph;

calculating, by using an l-th GDT layer of the plurality of GDT layers, an attention matrix of the dependency tree graph based on one-hop attention between any two of the plurality of the nodes in the dependency tree graph;

calculating, by the computing device, graph attention diffusion from multi-hop attention between any two of the plurality of nodes in the dependency tree graph based on the attention matrix;

obtaining, by the computing device, an embedding of the dependency tree graph using the graph attention diffusion;

classifying, by the computing device, the aspect term based on the embedding of the dependency tree graph to obtain predicted classification of the aspect term;

calculating, by the computing device, a loss function based on the predicted classification of the aspect term and the classification label of the aspect term; and adjusting, by the computing device, parameters of models in the computer executable code, wherein the step of calculating the attention matrix comprises:

calculating an attention score $s_{i,j}^{(l)}=\sigma_2\ (v^*\sigma_1(W_h h_i^{(l)} \| W_h h_j^{(l)}))$ for nodes i and node j in the dependency tree graph, wherein $W_h$, $W_t \in \mathbb{R}^{d \times d}$ and $v \in \mathbb{R}^{2 \times d}$ are learnable weights, $h_i^{(l)}$ is a feature of node i at the l-th graph diffusion attention (GDT) layer of the plurality of GDT layers, d is a hidden dimension of $h_i^{(l)}$, $\|$ is a concatenation operation, $\sigma_1$ is a ReLU activation function, and $\sigma_2$ is a LeakyReLU activation function;

obtaining attention score matrix $S^{(l)}$ by:

$$S^{(l)} = \begin{cases} s_{i,j}^{(l)}, & \text{if there is an edge between } i \text{ and } j \\ -\infty, & \text{otherwise} \end{cases};$$

calculating the attention matrix $A^{(l)}$ by: $A^{(l)}=\text{softmax}(S^{(l)})$.

11. The method of claim 10, wherein the step of converting the sentence into the dependency tree graph comprises:

embedding the aspect term to obtain an aspect term embedding $X_t$;

converting the aspect term embedding to aspect term feature $H_\alpha$ by: $\alpha=\text{softmax}(\sigma(W_2\sigma(W_1 X_t^T)))$ (1) and $H_\alpha = \alpha X_t$ (2), wherein $\alpha \in \mathbb{R}^{1 \times m}$, $H_\alpha \in \mathbb{R}^{1 \times d}$, m is a positive integer indicating a number of embedding tokens of the aspect term, d is a positive integer indicating dimensions of aspect term embedding, $X_t^T$ is the transposition of $X_t$, and a denotes tanh activation function, $W_1$ and $W_2$ are matrices pertaining to learnable weights;

embedding the context to obtain context embeddings $X_C$, each of the context embeddings corresponding to a word or a punctuation in the sentence that are not the aspect term;

parsing the sentence into a dependency tree; and combining the aspect term feature $H_\alpha$, the context embeddings $X_C$, and the dependency tree into the dependency tree graph, wherein each node of the dependency tree graph has a feature corresponding to one of the aspect term embedding and the context embeddings.

12. The method of claim 11, wherein the step of calculating the graph attention diffusion comprises:

calculating diffusion attention matrix $\tilde{A}^{(l)}$ by: $\tilde{A}^{(l)} = \Sigma_{hop=0}^{\infty} \alpha(1-\alpha)^{hop} A^{hop(l)} \alpha \Sigma\ (0,1]$, wherein hop is a positive integer in a range of 2-12, and $\alpha$ is an attention decay factor; and calculating the graph attention diffusion $\overline{H^{(l+1)}}$ by: $\overline{H^{(l+1)}}=\tilde{A}^{(l)}H^{(l)}$, wherein $H^{(l)}$ is input dependency tree graph embedding of the l-th GDT layer.

13. The method of claim 12, wherein the $\overline{H^{(l+1)}}$ is approximated by:

$$Z^{(k+1)}=(1-\alpha)A^{(l)}Z^k+\alpha H^{(l)};$$

$$Z^{(0)}=H^{(l)};\ \text{and}$$

$$\overline{H^{(l+1)}}=Z^k,$$

wherein k is an integer in a range of [0–K].

14. The method of claim 13, wherein the step of obtaining the embedding of the dependency tree graph comprises:

concatenating the graph attention diffusions $\overline{H^{(l+1)}}$ of a plurality of heads to obtain concatenated attention diffusion $\hat{H}^{(l+1)}$ by: $\hat{H}^{(l+1)}=\text{Concat}(h_1^{(l+1)}, \ldots, h_T^{(l+1)})W^O$, wherein each of $h_1^{(l+1)}, \ldots, h_T^{(l+1)}$ corresponds to one of the plurality of graph attention diffusions $\overline{H^{(l+1)}}$, $W^O = \mathbb{R}^{Td_h \times Td_h}$, T is a number of heads, $d_h$ is hidden dimensions of each head, and $d_h=d/T$;

performing $\hat{H}^{l+1}=\hat{H}^{(l+1)}+\text{Norm}(H^{(l)})$; and performing $H^{(l+1)}=W_2\ (\sigma(W_1\text{Norm}(\hat{H}^{(l+1)})))+\hat{H}^{(l+1)}$, where $W_1 \in \mathbb{R}^{d \times d}$ and $W_2 \in \mathbb{R}^{d \times d}$ are trainable matrix, $\sigma$ represents ReLU activation function, and $H^{(l+1)}$ is the embedding of the dependency tree graph.

15. The method of claim 14, wherein the step of classifying the aspect term comprises:

$\hat{y}=W_2\sigma(W_1\hat{H}_t^T)$, wherein $W_2 \in \mathbb{R}^{C \times d_{out}}$ and $W_1 \in \mathbb{R}^{d_{out} \times d_h}$ are learnable weight matrices, C is class number of the classification, $\sigma$ is tanh activation function, $\hat{H}_t$ is aspect term embedding extracted from the embedding $\hat{H}^{(l+1)}$, $\hat{H}_t^T$ is transpose of $\hat{H}_t$, and $d_{out}$ is dimensions of $H^{(l+1)}$.

16. The method of claim 15, wherein the loss function is calculated by:

$\text{loss}=-\Sigma_{c=1}^C y\ \log\hat{y}+\lambda\|\theta\|^2$, wherein $\lambda$ is a coefficient for L2-regularization, $\theta$ are parameters that need to be regularized, and y is the label of the aspect term.

17. The method of claim 16, further comprising:

receiving a query sentence and a query aspect term from the query sentence;

converting the query sentence into a query dependency tree graph;

calculating a query attention matrix of the query dependency tree graph based on one-hop attention between any two of a plurality of the nodes in the query dependency tree;

calculating a query graph attention diffusion from the query attention matrix;

obtaining a query embedding of the query dependency tree graph using the query graph attention diffusion;

classifying the query aspect term based on the query embedding of the query dependency tree graph to obtain predicted classification of the query aspect term; and labeling the query aspect term with the predicted classification.

18. A non-transitory computer readable medium storing computer executable code, wherein the computer executable code comprises a plurality of graph diffusion transformer (GDT) layers, and wherein the computer executable code, when executed at a processor of an active computing device, is configured to:

receive a sentence having an aspect term and context, the aspect term having a classification label;

convert the sentence into a dependency tree graph;

calculate, by using an l-th GDT layer of the plurality of GDT layers, an attention matrix of the dependency tree graph based on one-hop attention between any two of a plurality of nodes in the dependency tree graph;

calculate graph attention diffusion from multi-hop attention between any two of the plurality of nodes in the dependency tree graph based on the attention matrix;

obtain an embedding of the dependency tree graph using the graph attention diffusion;

classify the aspect term based on the embedding of the dependency tree graph to obtain predicted classification of the aspect term;

calculate a loss function based on the predicted classification of the aspect term and the classification label of the aspect term; and adjust parameters of models in the computer executable code, wherein the l-th GDT layer of the plurality of GDT layers is configured to:

calculate the attention matrix by:

calculating an attention score $s_{i,j}^{(l)} = \sigma_2(v * \sigma_1(W_h h_i^{(l)} \| W_t h_j^{(l)}))$ for nodes i and node j in the dependency tree graph, wherein $W_h, W_t \in \mathbb{R}^{d \times d}$ and $v \in \mathbb{R}^{2 \times d}$ are learnable weights, $h_i^{(l)}$ is a feature of node i at the l-th GDT layer of the plurality of GDT layers, d is a hidden dimension of $h_i^{(l)}$, $\|$ is a concatenation operation, $\sigma_1$ is a ReLU activation function, and $\sigma_2$ is a LeakyReLU activation function;

obtaining attention score matrix $S^{(l)}$ by:

$$S^{(l)} = \begin{cases} s_{i,j}^{(l)}, & \text{if there is an edge between } i \text{ and } j \\ -\infty, & \text{otherwise} \end{cases};$$

calculating the attention matrix $A^{(l)}$ by: $A^{(l)} = \text{softmax}(S^{(l)})$.

19. The non-transitory computer readable medium of claim 18, wherein the computer executable code is configured to:

calculate the graph attention diffusion by:

calculating diffusion attention matrix $\tilde{A}^{(l)}$ by: $\tilde{A}^{(l)} = \Sigma_{hop=0}^{\infty} \alpha(1-\alpha)^{hop} A^{hop(l)}$, $\alpha \Sigma (0, 1]$, wherein hop is a positive integer in a range of 2-12, and $\alpha$ is an attention decay factor; and calculating the graph attention diffusion $\overline{H^{(l+1)}}$ by: $\overline{H^{(l+1)}} = \tilde{A}^{(l)} H^{(l)}$, wherein $H^{(l)}$ is input dependency tree graph embedding of the l-th GDT layer; obtain the embedding of the dependency tree graph by:

concatenating the graph attention diffusions $\overline{H^{(l+1)}}$ of a plurality of heads to obtain concatenated attention diffusion $\hat{H}^{(l+1)}$ by: $\hat{H}^{(l+1)} = \text{Concat}(h_1^{(l+1)}, \ldots, h_T^{(l+1)}) W^o$, wherein each of $h_1^{(l+1)}, \ldots, h_T^{(l+1)}$ corresponds to one of the multi-head diffusion attentions $\overline{H^{(l+1)}}$, $W^o = \mathbb{R}^{Td_h \times Td_h}$, T is a number of heads, $d_h$ is hidden dimensions of each head, and $d_h = d/T$;

performing $\tilde{H}^{l+1} = \hat{H}^{(l+1)} + \text{Norm}(H^{(l)})$; and performing $H^{(l+1)} = W_2(\sigma(W_1 \text{Norm}(\tilde{H}^{(l+1)}))) + \hat{H}^{(l+1)}$, wherein $W_1 \in \mathbb{R}^{d \times d}$ and $W_2 \in \mathbb{R}^{d \times d}$ are trainable matrix, $\sigma$ represents ReLU activation function, wherein $H^{(l+1)}$ is the embedding of the dependency tree graph;

classify the aspect term by: $\hat{y} = W_2 \sigma(W_1 \hat{H}_t^T)$, wherein $W_2 \in \mathbb{R}^{C \times d_{out}}$ and $W_1 \in \mathbb{R}^{d_{out} \times d_h}$ are learnable weight matrix, C is class number of the classification, $\sigma$ is tanh activation function, $\hat{H}_t$ is aspect term embedding extracted from the embedding $H^{(l+1)}$, $\hat{H}_t^T$ is transpose of $\hat{H}_t$, and $d_{out}$ is dimensions of $H^{(l+1)}$; and calculate the loss function by: $\text{loss} = -\Sigma_{c=1}^C y \log \hat{y} + \lambda \|\theta\|^2$, wherein $\lambda$ is a coefficient for L2-regularization, $\theta$ are parameters that need to be regularized, and y is the label of the aspect term.

* * * * *